(12) United States Patent
Hiraguchi

(10) Patent No.: US 7,246,765 B2
(45) Date of Patent: *Jul. 24, 2007

(54) RECORDING TAPE CARTRIDGE

(75) Inventor: Kazuo Hiraguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 131 days.

This patent is subject to a terminal disclaimer.

(21) Appl. No.: 11/088,915

(22) Filed: Mar. 25, 2005

(65) Prior Publication Data

US 2005/0211813 A1  Sep. 29, 2005

(30) Foreign Application Priority Data

Mar. 26, 2004 (JP) .............................. 2004-093317
Mar. 14, 2005 (JP) .............................. 2005-072054

(51) Int. Cl.
G03B 23/02 (2006.01)

(52) U.S. Cl. ..................................... 242/338.1; 360/132

(58) Field of Classification Search ................ 242/338, 242/338.1, 343, 343.2, 348, 348.2; 360/132
See application file for complete search history.

(56) References Cited

U.S. PATENT DOCUMENTS

| 3,920,196 | A | * | 11/1975 | Tucker et al. ............. 242/338.1 |
| 4,014,042 | A | * | 3/1977 | Schoettle et al. ............ 242/338 |
| 4,033,523 | A | * | 7/1977 | Roman ..................... 242/338.1 |
| 4,210,296 | A | * | 7/1980 | Frechette ................. 242/338.1 |
| 4,742,415 | A | | 5/1988 | Oishi |
| 5,813,622 | A | | 9/1998 | von Alten |
| 5,901,916 | A | | 5/1999 | McAllister et al. |
| 6,318,657 | B1 | | 11/2001 | Nayak |
| 6,452,747 | B1 | | 9/2002 | Johnson et al. |
| 7,040,564 | B1 | * | 5/2006 | Veno et al. ............... 242/338.1 |
| 7,104,486 | B2 | * | 9/2006 | Hiraguchi ................. 242/338.1 |
| 2001/0026030 | A1 | | 10/2001 | Morita et al. |
| 2002/0141087 | A1 | | 10/2002 | Hiraguchi et al. |
| 2005/0023400 | A1 | | 2/2005 | Hiraguchi |

(Continued)

FOREIGN PATENT DOCUMENTS

EP 0 347 947 A2 6/1989

(Continued)

*Primary Examiner*—William A. Rivera
(74) *Attorney, Agent, or Firm*—Sughrue Mion, PLLC

(57) ABSTRACT

In a recording tape cartridge, a reel, at which a magnetic tape is wound around a cylindrical tube portion of a reel hub provided at an axially central portion of the reel, is accommodated within a case so as to be movable in an axial direction between a ceiling plate and a floor plate. A locking member can be set at a restricting position, at which, in a state in which the reel is shifted toward the floor plate, a lock portion is disposed in a gap between a top end portion of the reel and the ceiling plate and the locking member restricts axial direction movement of the reel, and a restriction releasing position, at which the locking member is withdrawn from the restricting position and permits the axial direction movement of the reel. When the locking member is positioned at the restricting position, among surfaces of the reel which face toward the floor plate, only a bottom end surface of an annular rib, which is a portion positioned further toward a radial direction inner side than an outer peripheral surface of the cylindrical tube portion, abuts an abutment surface of the case.

8 Claims, 12 Drawing Sheets

U.S. PATENT DOCUMENTS

| | | |
|---|---|---|
| 2005/0184179 A1 | 8/2005 | Hiraguchi |
| 2005/0184180 A1 | 8/2005 | Hiraguchi |
| 2005/0184181 A1 | 8/2005 | Hiraguchi |
| 2005/0184182 A1 | 8/2005 | Hiraguchi |

FOREIGN PATENT DOCUMENTS

| | | |
|---|---|---|
| EP | 0 488 387 A1 | 6/1992 |
| EP | 1 098 321 A1 | 5/2001 |
| EP | 1 569 229 A2 | 8/2005 |
| EP | 1 569 232 A2 | 8/2005 |
| JP | 5-258524 A | 10/1993 |
| JP | 7-161166 A | 6/1995 |
| JP | 11-398833 A | 2/1999 |
| WO | WO 98/44506 A2 | 10/1998 |

* cited by examiner

RECORDING TAPE CARTRIDGE

CROSS-REFERENCE TO RELATED APPLICATION

This application claims priority under 35 USC 119 from Japanese Patent Application Nos. 2004-93317 and 2005-72054, the disclosure of which is incorporated by reference herein.

BACKGROUND OF THE INVENTION

1. Technical Field

The present invention relates to a recording tape cartridge which rotatably accommodates, within a case, a reel around which a recording tape, such as a magnetic tape or the like, is wound.

2. Description of the Related Art

Recording tapes such as magnetic tapes for example are used as external recording media for computers and the like. There are recording tapes which can record a large amount of information. There are recording tape cartridges which rotatably accommodate a single reel on which such a recording tape is wound. Among such cartridges, there is a type which requires little space for accommodation at the time of storage thereof. The reel has a hub provided at the axially central portion thereof, and a pair of flanges which oppose one another and extend outwardly in the radial direction from both axial direction end portions of the hub or vicinities thereof. The recording tape is wound around the outer periphery of the hub between the pair of flanges.

Such a recording tape cartridge has a braking means so that the reel does not rotate within the case when the recording tape cartridge is not in use (see, for example, Japanese Patent Application Laid-Open (JP-A) No. 63-251983). This JP-A No. 63-251983 discloses the following structure: an engaging gear is provided in an annular form at the floor surface of a reel hub which is shaped as a cylindrical tube having a floor and which structures the axially central portion of a reel. A locking member, which is disc-shaped and at which is provided a braking gear which can mesh with the engaging gear, is inserted within the reel hub. The locking member is supported so as to be unable to rotate with respect to the case, and so as to be slidable in the axial direction of the reel. Due to the urging force of a compression coil spring provided between the case and the locking member, the braking gear is made to mesh with the engaging gear of the reel. In this state, the reel is pressed against the floor plate of the case by the urging force of the compression coil spring. Rotation of the reel with respect to the case is locked due to the braking gear of the locking member meshing with the engaging gear due to this urging force.

In this structure, a through hole is formed in the floor portion of the reel hub. When a releasing portion of a drive device enters in from this through hole and pushes the locking member upward against the urging force of the compression coil spring, the meshed-together state of the braking gear and the engaging gear is cancelled, and rotation of the reel with respect to the case is permitted. The releasing portion of the drive device is provided at a rotating shaft together with a driving gear which meshes with a reel gear formed at the end surface of the reel hub. As the driving gear meshes with the reel gear, the releasing portion pushes the locking member upward. Accordingly, in this structure, when the rotating shaft drives and rotates the reel, the locking member, which cannot rotate with respect to the case, and the releasing portion, which rotates integrally with the rotating shaft, slidingly-contact one another while being pressed against one another due to the urging force of the compression coil spring. In order to reduce the resistance to rotation which arises accompanying this sliding-contact, the locking member and the releasing portion are both formed of resin materials.

Further, a structure which is similar to that disclosed in above-described JP-A No. 63-251983 has been conceived of in which a releasing member, which rotates integrally with the reel, is provided between the locking member and the floor portion of the reel hub (see, for example, Japanese Patent No. 3187022). Specifically, due to the releasing member being pushed by a releasing portion of a drive device, the releasing member is pushed upward together with the locking member against the urging force of the compression coil spring. In this way, the locking member is pushed upward by the releasing portion via the releasing member, and the locked state of the reel is cancelled. In this structure, due to the releasing member rotating integrally with the reel at the time when the reel is driven to rotate, the releasing portion and the releasing member do not slidingly-contact one another, and the releasing member and the locking member slidingly-contact one another.

Moreover, a structure is known in which, at the time when the reel is driven to rotate, the locking member does not slidingly-contact any other portion (see, for example, JP-A No. 11-25648). In this structure, the engaging gear is formed at the outer peripheral portion of a flange of the reel. Rotation of the reel is locked due to two locking members, each of which is rotatably supported within the case and is urged in a direction of meshing with the engaging gear, meshing together with the engaging gear. When this recording tape cartridge is loaded into a drive device, the locking members are pushed by releasing portions of the drive device, and rotate against the aforementioned urging force. In this way, the meshing together of the locking members and the engaging gear is released, and rotation of the reel is permitted. These releasing portions are respectively provided independently of the rotating shaft, and push the locking members due to the loading of the recording tape cartridge (the case) into the drive device or the lowering of the recording tape cartridge (the case) within the drive device. In this structure, the compression coil spring, which is for pressing the reel against the case or the rotating shaft, is connected to the reel via a bearing. Relative rotation between the compression coil spring and the reel is absorbed by the bearing.

However, in the recording tape cartridges relating to the above-described structures, when the recording tape is not being used, the reel is pressed against the floor plate of the case by the urging force of the compression coil spring, and is thereby held with respect to the case. Therefore, when force resisting the urging force of the compression coil spring is applied, upward and downward movement of the reel within the case cannot be impeded. Thus, for example, if the region where the reel gear is formed at the reel, which region is exposed from the case (i.e., the outer surface of the floor portion of the reel hub), is pushed or if impact of a drop is applied to this region, the reel joggles greatly within the case, which is a cause of damage to the recording tape whose one end portion is held at the case via a leader member. Further, if the reel joggles greatly within the case and the flanges of the reel interfere with the case, the flanges may deform and cause damage to the recording tape. Namely, changes in the posture of the reel and deformation of the reel are causes of damage to the recording tape.

SUMMARY OF THE INVENTION

In view of the aforementioned, a recording tape cartridge in which changes in the posture of and deformation of a reel within a case can be prevented at times when the recording tape cartridge is not being used, is demanded.

A recording tape cartridge relating to a first aspect of the present invention has: a reel, a recording tape being wound around an outer periphery of a cylindrical tubular hub provided at an axially central portion of the reel; a case having a ceiling plate and a floor plate which oppose one another, the reel being accommodated in the case so as to be able to move along an axial direction between the ceiling plate and the floor plate; and a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel. When the locking member is positioned at the restricting position, among surfaces of the reel which face toward the floor plate, only a portion which is positioned further toward a radial direction inner side than an outer peripheral surface of the hub abuts the case.

When the recording tape cartridge is not being used, e.g., is being stored or transported or the like, axial direction movement of the reel is restricted due to the locking member being disposed between the ceiling plate and the ceiling plate side end portion of the reel which is shifted toward the floor plate of the case, i.e., due to the locking member being positioned at the restricting position. In this way, joggling (changes in the posture) of the reel within the case when the recording tape cartridge is not in use is prevented. When the recording tape cartridge is being used, due to the reel moving from the restricting position to the restriction releasing position, the reel can move along the axial direction toward the ceiling plate.

In the state in which the locking member is positioned at the restricting position and restricts axial direction movement of the reel, among the surfaces of the reel which face toward the floor plate, only the portion which is positioned further toward the radial direction inner side than the outer peripheral surface of the hub abuts the case. Therefore, when the reel attempts to move in the axial direction, the movement restricting force which restricts this movement is not applied to the portion of the floor plate side portion of the reel, which portion is further toward the outer side than the outer peripheral surface of the hub. In this way, if force moving the reel in the axial direction is applied when the recording tape cartridge is not in use, the movement restricting force is not applied to, for example, the flange extending outwardly in the radial direction from the floor plate side end of the hub of the reel, or the like, and deformation of this flange or the like can be prevented.

In this way, in the recording tape cartridge of the first aspect of the present invention, it is possible to prevent a change in the posture of and deformation of the reel within the case, when the recording tape cartridge is not being used. Note that the portion of the reel, which portion is further toward the radial direction inner side than the outer peripheral surface of the hub, includes the axial direction end surface of the hub itself which is formed in the shape of a cylindrical tube, as well as, for example, a portion of a member mounted to the end surface of the hub which portion is at the radial direction inner side of the outer peripheral surface of the hub (e.g., the connecting portion of a flange or the like with the end surface of the hub), or the like. Further, the surface of the reel which surface faces toward the floor plate is not limited to a surface which is parallel to the floor plate (a surface orthogonal to the axis of the hub), and may be, for example, a conical surface, an inclined surface, or the like. Moreover, the state in which the reel is shifted toward the floor plate is a state in which movement, of a permitted amount or more, of the reel toward the floor plate is restricted, and is not limited to a state in which the reel is abutting a floor plate side portion of the case (including the floor plate itself).

A recording tape cartridge relating to a second aspect of the present invention has: a reel, a recording tape being wound around an outer periphery of a cylindrical tubular hub provided at an axially central portion of the reel; a case having a ceiling plate and a floor plate which oppose one another, the reel being accommodated in the case so as to be able to move along an axial direction between the ceiling plate and the floor plate; and a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel, wherein the case and the locking member have portions which overlap one another between inner and outer peripheral surfaces of the hub as seen from the axial direction of the reel, wherein a region of the reel which region abuts the locking member when axial direction movement of the reel toward the ceiling plate is restricted by the locking member positioned at the restricting position, and a region of the reel which region abuts the case when axial direction movement of the reel toward the floor plate is restricted by the case, overlap one another in a peripheral direction and a radial direction of the hub between inner and outer peripheral surfaces of the hub.

When the recording tape cartridge of the second aspect of the present invention is not being used, e.g., is being stored or transported or the like, axial direction movement of the reel is restricted due to the locking member being disposed between the ceiling plate and the ceiling plate side end portion of the reel which is shifted toward the floor plate of the case, i.e., due to the locking member being positioned at the restricting position. In this way, joggling (changes in the posture) of the reel within the case when the recording tape cartridge is not in use is prevented. When the recording tape cartridge is being used, due to the reel moving from the restricting position to the restriction releasing position, axial direction movement of the reel becomes possible.

In the state in which the locking member is positioned at the restricting position and restricts axial direction movement of the reel, between the inner and outer peripheral surfaces of the hub of the reel (i.e., in the range of the thickness of the hub), a portion of or all of the region that attempts to move toward the ceiling plate and abuts the locking member, and a portion of or all of the region that attempts to move toward the floor plate and abuts the case, overlap one another in the radial direction and the peripheral direction of the reel (as seen from the axial direction). In other words, the case and the locking member are positioned on a straight line running along the axis of the reel, with the portion of the hub between the inner and outer peripheral surfaces of the hub being between the case and the locking member (i.e., as if the case and the locking member oppose one another with this portion of the hub therebetween). Thus, the movement restricting force is prevented from generating a couple of forces (a moment) which tilts the reel. Therefore, even in a structure in which, for example, the reel makes a portion, such as a flange or the like, which is positioned further toward the radial direction outer side than the hub, abut the case, that region of contact is prevented from pushing and deforming the portion such as the flange or the like.

In this way, in the recording tape cartridge of the second aspect of the present invention, it is possible to prevent a change in the posture of and deformation of the reel within the case, when the recording tape cartridge is not being used. Note that the portion of the reel, which portion is positioned between the inner and outer peripheral surfaces of the hub as seen from the axial direction, includes the axial direction end surface of the hub itself which is formed in the shape of a cylindrical tube, as well as, for example, a portion of a member mounted to the end surface of the hub which portion is at the radial direction inner side of the outer peripheral surface of the hub (e.g., the connecting portion of a flange or the like with the end surface of the hub), or the like. Further, the surfaces of the reel, which surfaces abut the case and the locking member when the movement restricting force is applied, are not limited to surfaces which are orthogonal to the axis of the hub, and may be, for example, conical surfaces, inclined surfaces, or the like. Moreover, the regions of the reel, other than the region thereof between the inner and outer peripheral surfaces of the hub, may be structured so as to, together with this region between the inner and outer peripheral surfaces, receive movement restricting force from the locking member or the case (i.e., so as to abut the locking member or the case).

A recording tape cartridge relating to a third aspect of the present invention has: a reel, a recording tape being wound around an outer periphery of a cylindrical tubular hub provided at an axially central portion of the reel; a case having a ceiling plate and a floor plate which oppose one another, the reel being accommodated in the case so as to be able to move along an axial direction between the ceiling plate and the floor plate; and a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel, wherein, when the locking member is positioned at the restricting position, a surface area of abutment between the case and a portion of the reel, which portion is positioned between inner and outer peripheral surfaces of the hub as seen from the axial direction, is greater than a surface area of abutment between the case and other portions of the reel.

When the recording tape cartridge of the third aspect of the present invention is not being used, e.g., is being stored or transported or the like, axial direction movement of the reel is restricted due to the locking member being disposed between the ceiling plate and the ceiling plate side end portion of the reel which is shifted toward the floor plate of the case, i.e., due to the locking member being positioned at the restricting position. In this way, joggling (changes in the posture) of the reel within the case when the recording tape cartridge is not in use is prevented. When the recording tape cartridge is being used, due to the reel moving from the restricting position to the restriction releasing position, axial direction movement of the reel becomes possible.

In the state in which the locking member is positioned at the restricting position and restricts axial direction movement of the reel, the surface area of abutment between the case and the portion of the reel, which portion is positioned between the inner and outer peripheral surfaces of the hub, is greater than a surface area of abutment between the case and other portions of the reel. Thus, at the reel, the movement restricting force is applied mainly within the range of the aforementioned thickness of the hub. Namely, at the reel, the movement restricting force is applied mainly to the portion where the axial direction rigidity is high. In this way, if force moving the reel in the axial direction is applied when the recording tape cartridge is not being used, the force applied to, for example, a flange or the like extending toward the radial direction outer side from the hub of the reel is mitigated (dispersed), and deformation of the flange or the like can be prevented.

In this way, in the recording tape cartridge of the third aspect of the present invention, it is possible to prevent a change in the posture of and deformation of the reel within the case, when the recording tape cartridge is not being used. In particular, even if the case and the locking member are structured to include, between the inner and outer peripheral surfaces of the hub, a portion where the region abutting the locking member and the region abutting the case overlap one another in the radial direction and the peripheral direction of the hub when the locking member is positioned at the restricting position, the movement restricting force is prevented from generating a couple of forces (a moment) which tilts the reel, and when the locking member is positioned at the restricting position, the reel can reliably be prevented from tilting with respect to the case (a change in the posture of the reel can be reliably prevented). Note that the portion of the reel, which portion is in the range of the thickness of the hub along the radial direction, includes the axial direction end surface of the hub itself which is formed in the shape of a cylindrical tube, as well as, for example, a portion of a member mounted to the end surface of the hub which portion is at the radial direction inner side of the outer peripheral surface of the hub (e.g., the connecting portion of a flange or the like with the end surface of the hub), or the like. Further, the surfaces of the reel which surfaces abut the case and the locking member when the movement restricting force is applied, are not limited to surfaces which are orthogonal to the axis of the hub, and may be, for example, conical surfaces, inclined surfaces, or the like.

A recording tape cartridge relating to a fourth aspect of the present invention has: a reel, a recording tape being wound around an outer periphery of a cylindrical tubular hub provided at an axially central portion of the reel; a case having a ceiling plate and a floor plate which oppose one another, the reel being accommodated in the case so as to be able to move along an axial direction between the ceiling plate and the floor plate; an abutment portion provided at the floor plate along a circumference which is coaxial with the reel, the reel abutting the abutment portion at a time of non-use; and a locking member able to be set at a restricting position, at which, in a state in which the reel abuts the abutment portion, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel, wherein a length of abutment, along a radial direction, between the abutment portion and a portion of the reel which portion is positioned between inner and outer peripheral surfaces of the hub as seen from the axial direction, is greater than a length of abutment, along the radial direction, between the abutment portion and other portions of the reel.

When the recording tape cartridge of the fourth aspect of the present invention is not being used, e.g., is being stored or transported or the like, axial direction movement of the reel is restricted due to the locking member being disposed between the ceiling plate and the ceiling plate side end portion of the reel which abuts the abutment portion provided at the floor plate of the case, i.e., due to the locking member being positioned at the restricting position. In this way, joggling (changes in the posture) of the reel within the case when the recording tape cartridge is not in use is prevented. When the recording tape cartridge is being used, due to the reel moving from the restricting position to the restriction releasing position, axial direction movement of the reel becomes possible.

In the state in which the locking member is positioned at the restricting position and restricts axial direction movement of the reel, the abutment length, along the radial direction, of the abutment portion of the case and the portion of the reel which portion is positioned between the inner and outer peripheral surfaces of the hub, is greater than an abutment length, along the radial direction, of the abutment portion and other portions of the reel. Thus, at the reel, the movement restricting force is applied mainly within the range of the aforementioned thickness of the hub. Namely, at the reel, the movement restricting force is applied mainly to the portion where the axial direction rigidity is high. In this way, if force moving the reel in the axial direction is applied when the recording tape cartridge is not being used, the force applied to, for example, a flange or the like extending toward the radial direction outer side from the hub of the reel is mitigated (dispersed), and deformation of the flange or the like can be prevented.

In this way, in the recording tape cartridge of the fourth aspect of the present invention, it is possible to prevent a change in the posture of and deformation of the reel within the case, when the recording tape cartridge is not being used. In particular, even if the case and the locking member are structured to include, between the inner and outer peripheral surfaces of the hub, a portion where the region abutting the locking member and the region abutting the case overlap one another in the radial direction and the peripheral direction of the hub when the locking member is positioned at the restricting position, the movement restricting force is prevented from generating a couple of forces (a moment) which tilts the reel, and when the locking member is positioned at the restricting position, the reel can reliably be prevented from tilting with respect to the case (a change in the posture of the reel can be reliably prevented). Note that the portion of the reel, which portion is in the range of the thickness of the hub along the radial direction, includes the axial direction end surface of the hub itself which is formed in the shape of a cylindrical tube, as well as, for example, a portion of a member mounted to the end surface of the hub which portion is at the radial direction inner side of the outer peripheral surface of the hub (e.g., the connecting portion of a flange or the like with the end surface of the hub), or the like. Further, the surfaces of the reel, which surfaces abut the case and the locking member when the movement restricting force is applied, are not limited to surfaces which are orthogonal to the axis of the hub, and may be, for example, conical surfaces, inclined surfaces, or the like.

DETAILED DESCRIPTION OF THE INVENTION

A recording tape cartridge 10 relating to an embodiment of the present invention will be described on the basis of FIGS. 1 through 11. For convenience of explanation, the direction of loading the recording tape cartridge 10 into a drive device (the direction of arrow A shown for convenience in FIG. 1 and the like) is the front direction, and the directions of arrow B and arrow C, which are respectively perpendicular to arrow A, are the left direction and the top direction, respectively.

Structure of Case

Figure 1:
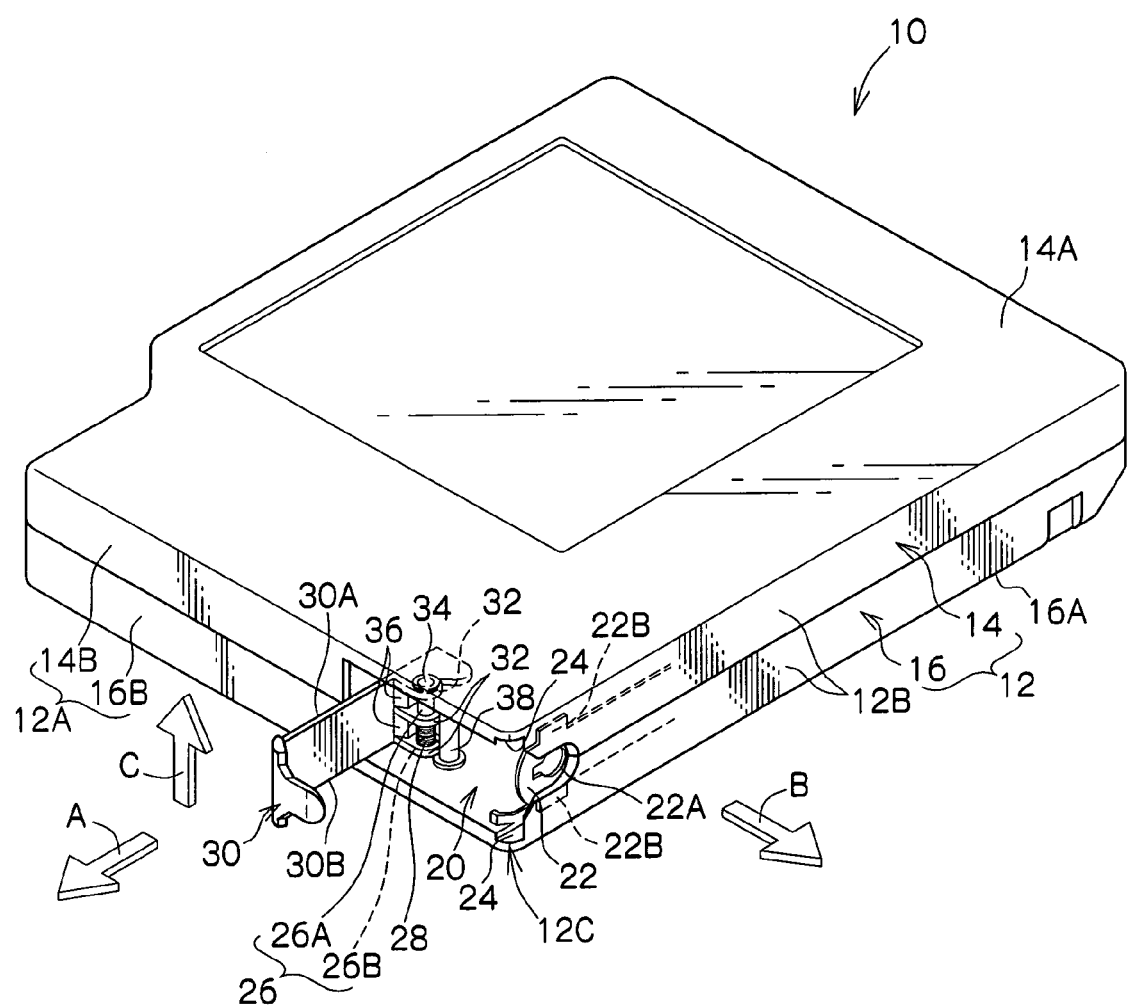
FIG. 1 is a schematic perspective view of a recording tape cartridge relating to an embodiment of the present invention.
Figure 2:
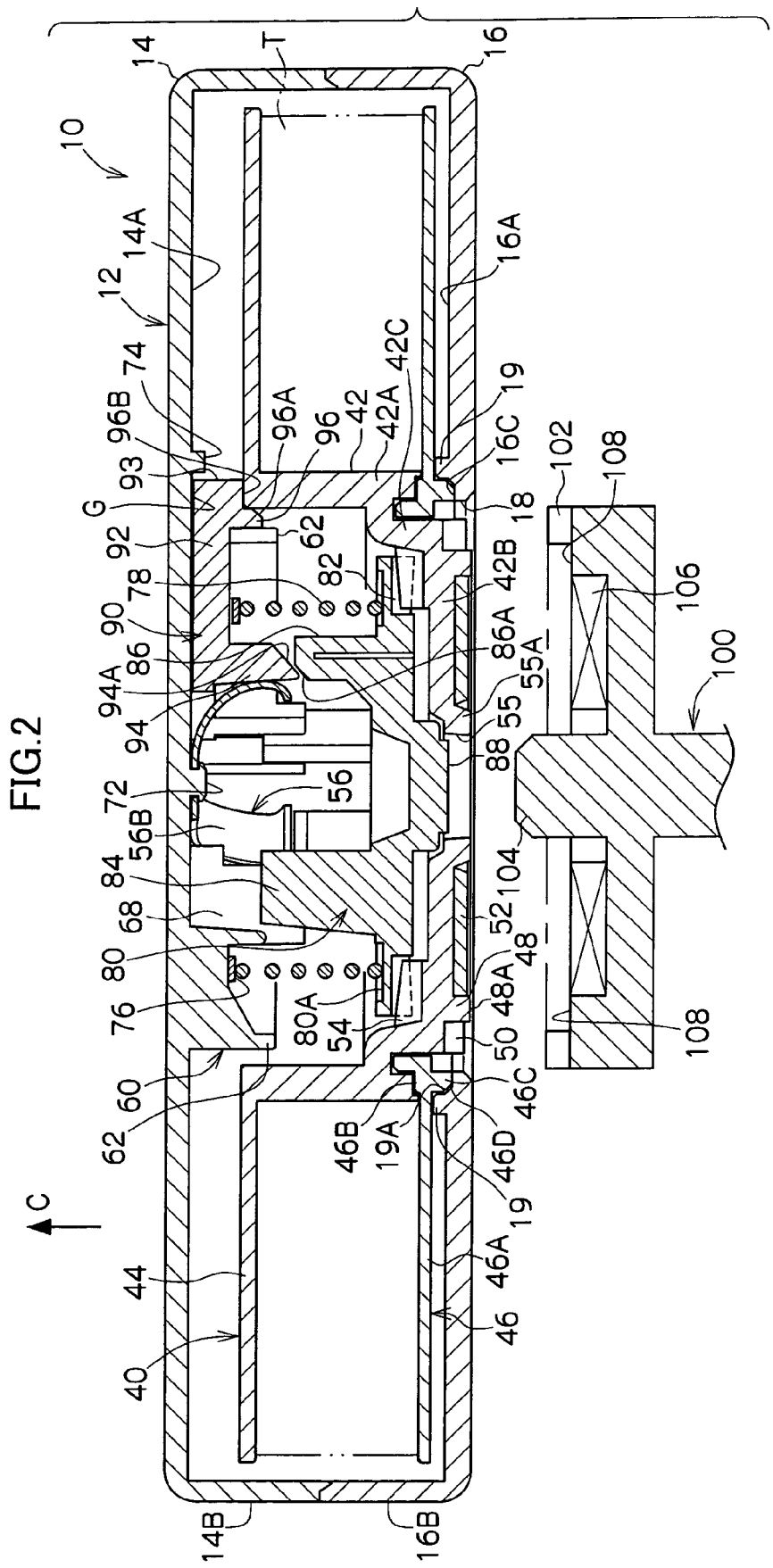
FIG. 2 is a side sectional view of a state in which the recording tape cartridge relating to the embodiment of the present invention is not in use.
Figure 3:
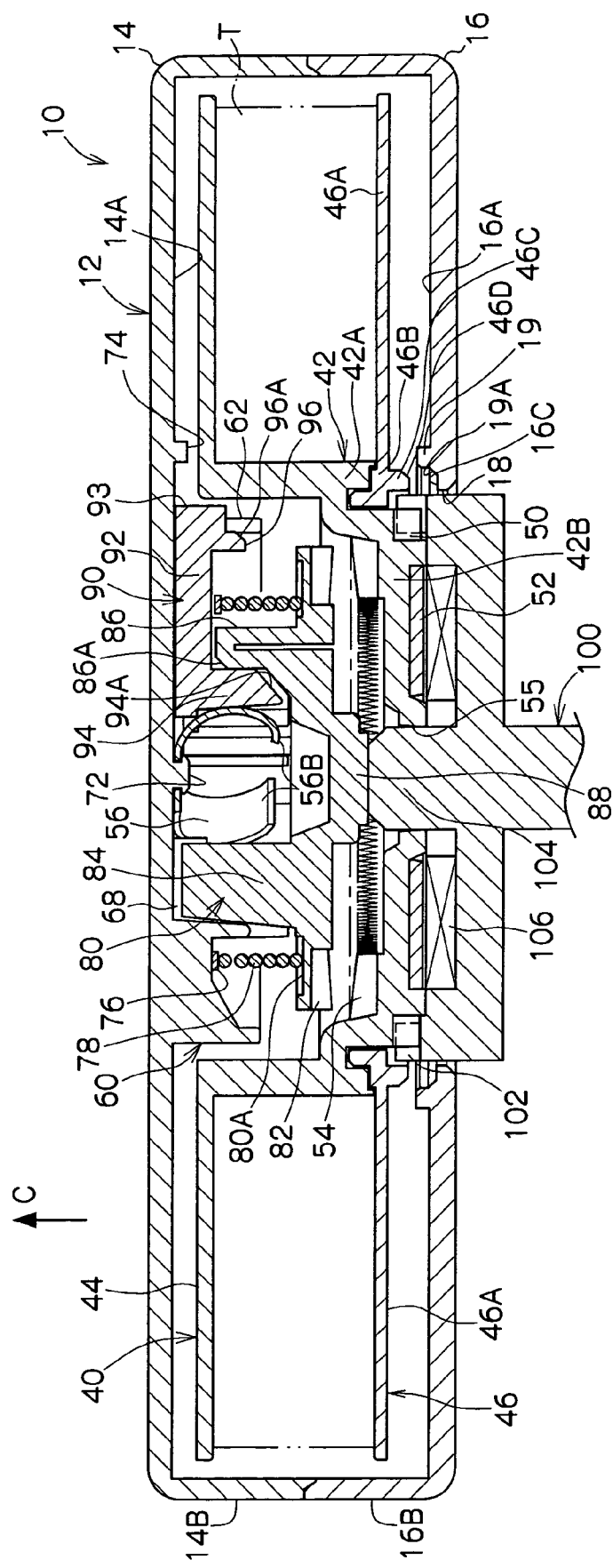
FIG. 3 is a side sectional view of a state in which a reel of the recording tape cartridge relating to the embodiment of the present invention rotates.

The exterior of the recording tape cartridge 10 is illustrated in a perspective view in FIG. 1. Sectional views at the time when the recording tape cartridge 10 is not in use and is being used are shown in FIGS. 2 and 3, respectively. As shown in these drawings, the recording tape cartridge 10 has a case 12. The case 12 is structured by an upper case 14 and a lower case 16 being joined together.

Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

As shown in FIG. 2, a reel 40, which will be described in detail later, is rotatably accommodated within the case 12. Only one reel 40 is provided. A magnetic tape T serving as a recording tape is wound on the reel 40. A leader tape 22 serving as a leader member is provided at the distal end of the magnetic tape T. A gear opening 18, which is for the rotating and driving of the reel 40 from the exterior, is provided in the floor plate 16A of the case 12. The structure around the gear opening 18 will be described later together with the reel 40.

An opening 20, which is for the pulling-out to the exterior of the magnetic tape T wound on the reel 40, is formed in a vicinity of a front left corner portion 12C which is the border portion between a front wall 12A (the forwardly-facing wall of the case 12 structured by the peripheral wall 14B and the peripheral wall 16B) and a left side wall 12B (the leftwardly-facing wall of the case 12 structured by the peripheral wall 14B and the peripheral wall 16B) of the case 12. The opening 20 is formed so as to extend over respective portions of the front wall 12A and the left side wall 12B which are adjacent to the corner portion 12C. The leader tape 22, which is fixed to an end portion of the magnetic tape T and is disposed along the left side wall 12B, is pulled-out from the opening 20.

The leader tape 22 is a pulled-out member which a pull-out member (not illustrated) of a drive device engages in order to pull-out the magnetic tape T. The leader tape 22 is a tape-shaped member which has substantially the same width as the magnetic tape T and higher strength than the magnetic tape T. A hole 22A, with which the pull-out member engages, is formed in a vicinity of the distal end of the leader tape 22. Jutting portions 22B, which jut-out at the transverse (vertical) direction both sides, are formed at the top and bottom sides of the leader tape 22 at a region which is slightly more rearward than the distal end of the hole 22A. The leader tape 22 is held within the case 12 due to the jutting portions 22B being accommodated (inserted) in accommodating portions 24 which are formed in the inner surface of the upper case 14 and the inner surface of the lower case 16, respectively.

When the recording tape cartridge 10 is not in use, the opening 20 is closed by a door 30. The door 30 is formed in a substantial "L" shape as seen in plan view, of substantially the same configuration and size as the opening 20. It is preferable that the door 30 be molded from an olefin resin such as POM (polyacetal) or the like. However, the door 30 may be molded from a resin such as PC (polycarbonate) or the like, or a metal such as SUS (stainless steel) or the like. The opening 20 is closed due to the door 30 rotating with, as the fulcrum of rotation thereof, a supporting shaft 26 which projects at the front wall 12A sides of the upper case 14 and the lower case 16, respectively. The specifics thereof will be described hereinafter.

The upper case 14 side of the supporting shaft 26 is a hollow-cylindrical boss 26A, and the lower case 16 side thereof is a solid-cylindrical boss 26B. The supporting shaft 26 is structured by the distal end (top end) of the boss 26B at the lower case 16 side being fit into the boss 26A at the upper case 14 side. Accordingly, the diameter of the boss 26B is slightly smaller than the diameter of the boss 26A. Three, flat-plate-shaped rotating sliding portions 32 project in parallel from the inner surface of the door 30 in a vicinity of the right end portion (a position which is shifted by a predetermined distance toward the left from the right end portion). These rotating sliding portions 32 respectively project from the top and bottom both end portions of the inner surface of the door 30, and from an intermediate portion which is slightly below the center. Through holes, in which the supporting shaft 26 is fit with play, are formed in the rotating sliding portions 32 respectively. Accordingly, the door 30 is supported rotatably by the supporting shaft 26 being inserted through the through holes.

Annular convex portions 34 are formed around the through holes at the top surface of the rotating sliding portion 32 at the upper end portion, and at the bottom surface of the rotating sliding portion 32 of the lower end portion, respectively. Due to the annular convex portions 34 contacting the ceiling plate 14A and the floor plate 16A, a clearance of about 0.3 mm to 0.5 mm is formed between a top end surface 30A of the door 30 and the ceiling plate 14A, and between a bottom end surface 30B of the door 30 and the floor plate 16A, respectively. The sliding resistance between the case 12 and the door 30 is thereby reduced.

Projecting portions 36, which are shaped, as seen in plan sectional view, in arc shapes which run along the peripheral surface of the supporting shaft 26, are formed at the inner surface of the door 30 between the rotating sliding portions 32. The door 30 is structured so as to rotate in the direction of opening the opening 20, due to the portion of the door 30, which portion is further toward the right than the supporting shaft 26, being pushed by an opening/closing member of a drive device.

The supporting shaft 26 is inserted through a wound portion of a torsion spring 28 which always urges the door 30 in the direction of closing the opening 20. Namely, in the state of being held between the rotating sliding portion 32 at the lower end portion and the rotating sliding portion 32 at the intermediate portion, the wound portion of the torsion spring 28 is fit on and attached to the boss 26B whose diameter is small. One end portion side of the torsion spring 28 is anchored on a screw boss 38 of the case 12 (a screw boss which projects at the lower case 16). The other end portion side of the torsion spring 28 is anchored on the right side edge portion of the projecting portion 36.

In this way, when the recording tape cartridge 10 is not in use, the door 30 closes the opening 20 due to the urging force of the torsion spring 28. When the portion of the door 30 further toward the right than the supporting shaft 26 is pushed by the opening/closing member as the recording tape cartridge 10 is loaded into a drive device, the door 30 rotates against the urging force of the torsion spring 28, and opens the opening 20.

Structure of Reel and the Like

Figure 7:
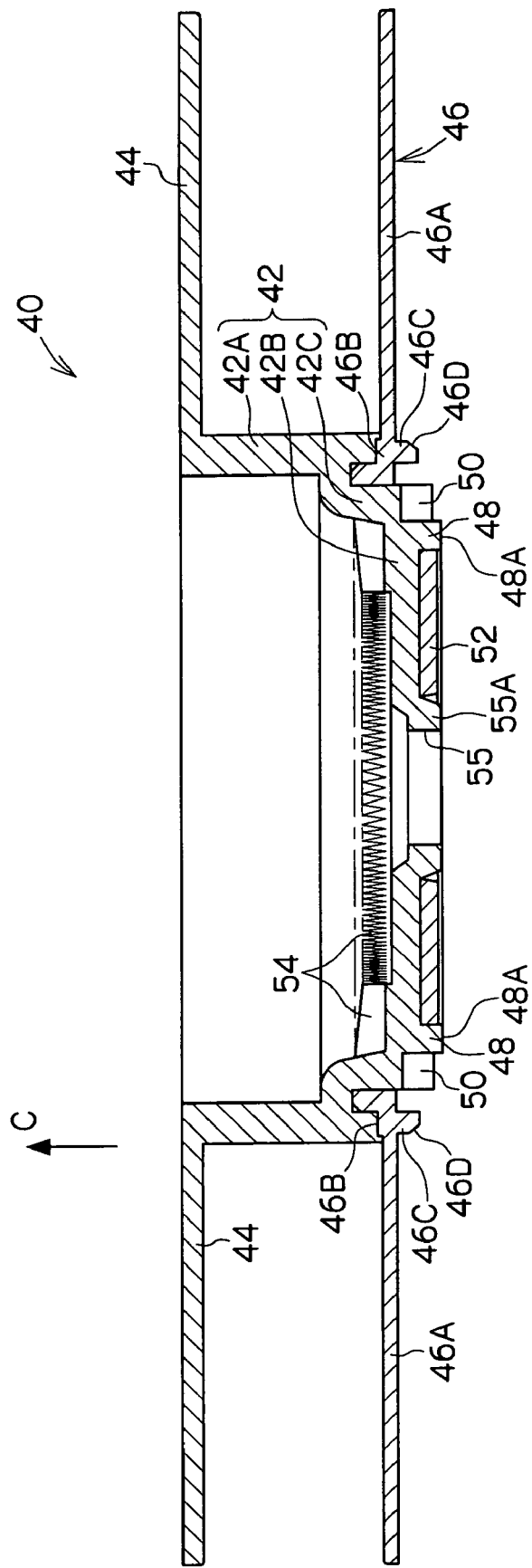
FIG. 7 is a sectional view of the reel structuring the recording tape cartridge relating to the embodiment of the present invention.

Next, the reel 40 will be described. As shown in FIG. 7, the reel 40 has a reel hub 42 which structures the axially central portion of the reel 40. The reel hub 42 has a cylindrical tube portion 42A which serves as the "hub" in the present invention, and around whose outer periphery the magnetic tape T is wound. The reel hub 42 has a floor plate portion 42B which is substantially disc-shaped, and an inner cylindrical tube portion 42C which is substantially shaped as a short, hollow cylinder and which connects the inner periphery of the lower portion of the cylindrical tube portion 42A with the outer peripheral portion of the floor plate portion 42B. A gap is formed between the inner cylindrical tube portion 42C and a vicinity of the lower end portion of the cylindrical tube portion 42A. The floor plate portion 42B is positioned so as to project further downward than the bottom end of the cylindrical tube portion 42A.

An upper flange 44 extends outwardly in the radial direction, integrally and coaxially from the open end (upper end) of the cylindrical tube portion 42A of the reel hub 42. By forming the upper flange 44 integrally with the open end side of the reel hub 42, the strength (rigidity) with respect to the winding of the magnetic tape T and the like is high. In the present embodiment, the top end surface of the cylindrical tube portion 42A and the top surface of the upper flange 44 are flush with one another.

A lower flange member 46 is joined, by ultrasonic welding or the like, to the bottom end portion of the cylindrical tube portion 42A. The lower flange member 46 is structured such that a lower flange 46A which corresponds to the upper flange 44, a welding portion 46B which is positioned at the radial direction inner side of the lower flange 46A and which is welded to the lower end of the cylindrical tube portion 42A of the reel hub 42, and an annular rib 46C which projects from the lower side of the welding portion 46B further downward than the bottom surface of the lower flange 46A, are formed coaxially.

Figure 8:
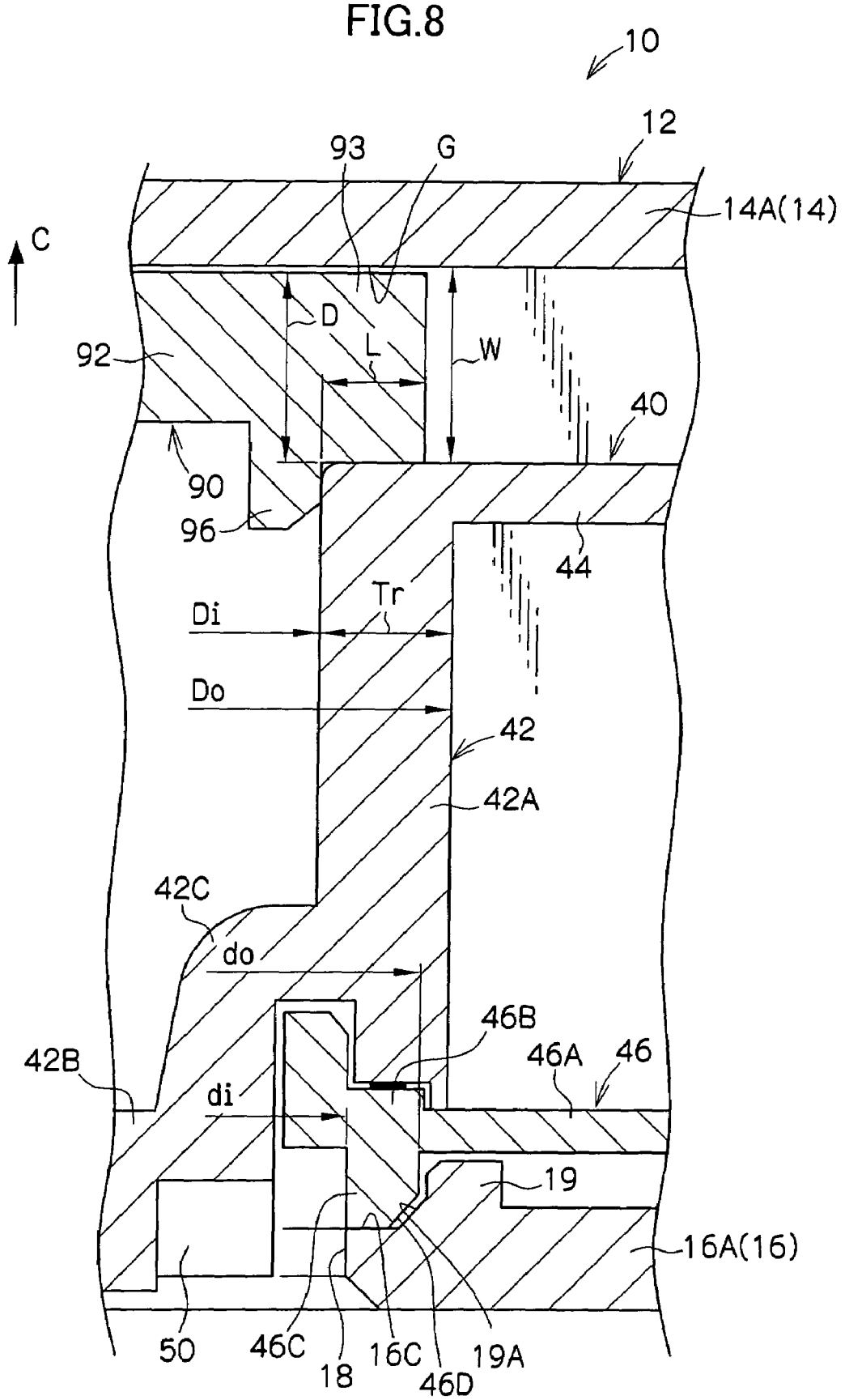
FIG. 8 is a sectional view showing, in an enlarged manner, a state in which axial direction movement of the reel structuring the recording tape cartridge relating to the embodiment of the present invention, is restricted.

As shown in FIG. 8, an inner diameter di of the annular rib 46C is formed to be larger than an inner diameter Di of the cylindrical tube portion 42A. An outer diameter do of the annular rib 46C is smaller than an outer diameter Do of the cylindrical tube portion 42A. Namely, the annular rib 46C is positioned within a range of a thickness tr (=(Do-Di)/2) of the cylindrical tube portion 42A along the radial direction, in the state in which the lower flange member 46 is welded to the bottom end surface of the cylindrical tube portion 42A at the welding portion 46B. The outer peripheral portion of the bottom end of the annular rib 46C is a taper surface 46D, and the outer diameter thereof is smaller than do.

In this state, the lower flange 46A opposes the upper flange 44 along substantially the entire surface thereof. In this way, at the reel 40, the magnetic tape T is wound around the outer peripheral surface of the cylindrical tube portion 42A of the reel hub 42, between the opposing surfaces of the lower flange 46A and the upper flange 44. The magnetic tape T is wound around the reel hub 42 so as to be closer to either the lower flange 46A or the upper flange 44. In the present embodiment, the magnetic tape T is wound so as to be closer to the upper flange 44 (although this is not illustrated). Namely, the surface of the upper flange 44 which surface opposes the lower flange 46A (i.e., the bottom surface of the upper flange 44) is the surface which the magnetic tape T abuts.

A reel gear 50 is formed in an annular form at the bottom surface (outer surface) of the floor plate portion 42B of the reel hub 42, coaxially therewith. The reel gear 50 can mesh with a driving gear 102 provided at a rotating shaft 100 of a drive device, due to relative movement therebetween in the axial direction. A reference convex portion 48, whose bottom end surface is a reference surface 48A, projects at the inner side of the reel gear 50 from the bottom surface of the floor plate portion 42B. The reference convex portion 48 is formed in the shape of a ring which is coaxial with the reel 40, and is formed to as to be continuous and integral with the radial direction inner end of the reel gear 50. Due to the reference surface 48A of the reference convex portion 48 abutting a positioning surface 108 of the rotating shaft 100, axial direction positioning of the reel 40 with respect to the drive device is carried out.

An engaging gear 54, with which the braking gear 82 of a braking member 80 to be described later can mesh, is provided at the interior of the reel hub 42. The engaging gear 54 is formed in the shape of a ring which is coaxial with the reel hub 42, so as to span between the floor plate portion 42B and the inner cylindrical tube portion 42C. The engaging gear 54 can mesh together with the braking gear 82 due to relative movement therebetween in the axial direction. A through hole 55 is formed in the axially central portion of the floor plate portion 42B. The through hole 55 is for operation of the braking member 80 from the exterior. In the present embodiment, the through hole 55 is structured so as to also have a function of, by fitting-together with the releasing projection 104 of the rotating shaft 100, centering at the time when the reel 40 is driven to rotate. Therefore, a boss portion 55A projects downward from the edge portion of the through hole 55 at the floor plate portion 42B, and is structured so as to ensure the length of fitting-together with the releasing projection 104. The bottom end surface of the boss portion 55A is substantially at the same level as the reference surface 48A.

Portions, other than the lower flange member 46, of the above-described reel 40 are formed integrally by resin molding. A reel plate 52, which is disc-shaped and formed of a magnetic material and in which a hole is formed, is mounted coaxially to the bottom surface of the floor plate portion 42B, between the reference convex portion 48 and the boss portion 55A. The reel plate 52 is fixed to the floor plate portion 42B by insert molding or caulking. The bottom surface of the reel plate 52 is positioned further upward than the reference surface 48A. The reel plate 52 is attracted and held by the magnetic force of a magnet 106 of the rotating shaft 100, without contacting the magnet 106.

As shown in FIG. 2, when the reel 40, which is structured as described above, is accommodated within the case 12 and is not being used, the reel gear 50, the reference surface 48A, the reel plate 52, and the like are exposed to the exterior from the gear opening 18. Specifics thereof will be described hereinafter.

The inner diameter of the gear opening 18 of the case 12 is substantially the same as the inner diameter of the annular rib 46C, and is larger than the outer diameter of the floor plate portion 42B of the reel 40. When the reel 40 is not being used, the bottom end surface of the annular rib 46C abuts the inner surface (top surface) of the floor plate 16A around the gear opening 18, and the floor plate portion 42B is disposed in the gear opening 18. Namely, when the reel 40 is not being used, the reel 40 is shifted toward the floor plate 16 side of the case 12. The position of the reel 40 at this time is called the lowermost position thereof. Note that the dimensions of the respective portions of the reel 40 are determined such that the respective portions of the reel 40 which is positioned at the lowermost position do not project further downward than the outer surface (bottom surface) of the floor plate 16A.

In the state in which the reel 40 is positioned at the lowermost position, a gap G (see FIG. 8), whose length along the axial direction of the reel 40 is W, exists between the ceiling plate 14A and the top end surface of the cylindrical tube portion 42A forming the top end of the reel 40 (i.e., the top surface of the upper flange 44), and the reel 40 can move upward in the axial direction. When the reel 40 is driven to rotate by the rotating shaft 100, as shown in FIG. 3, the reel 40 rises up within the case 12, and rotates without contacting the respective portions of the case 12. The position of the reel 40 at this time is called the raised position.

An annular rib 19 projects from the inner surface of the floor plate 16A at the outer side of the gear opening 18. The inner diameter of the annular rib 19 is slightly larger than the outer diameter do of the annular rib 46C. The outer diameter of the annular rib 19 is slightly larger than the outer diameter Do of the cylindrical tube portion 42A. The projecting height of the annular rib 19 from the floor plate 16A is slightly smaller than the projecting height of the annular rib 46C from the lower flange 46A. Further, the root portion of the annular rib 19 at the inner surface side is a taper surface 19A which substantially corresponds to the taper surface 46D of the annular rib 46C. Hereinafter, the portion of the inner surface of the floor plate 16A between the inner edge of the gear opening 18 and the inner edge of (the taper surface 19A of) the annular rib 19, i.e., the annular region abutted by the bottom end surface of the annular rib 46C when the recording tape cartridge 10 is not in use, is called abutment surface 16C.

The annular rib 19 is structured such that, in the state in which the reel 40 is positioned at its lowermost position (the bottom end surface of the annular rib 46C abuts the abutment surface 16C) and the reel 40 is centered, both the inner surface and the top end surface of the annular rib 19, including the taper surface 19A thereof, do not contact the respective portions of the reel 40. If the reel 40 attempts to become centrally shifted, the annular rib 19 interferes with the annular rib 46C so as to prevent such central shifted. Further, at the time when the reel 40 returns from its raised position to its lowermost position, the taper surface 46D of the reel 40 functions to guide the reel 40 in at the inner side of the annular rib 19.

Structure of Reel Lock Mechanism

When the above-described reel 40 is not in use, rotation of the reel 40 with respect to the case 12 is impeded, and upward and downward movement of the reel 40 with respect to the case 12 is restricted. Specifics thereof will be described hereinafter.

Figure 4:
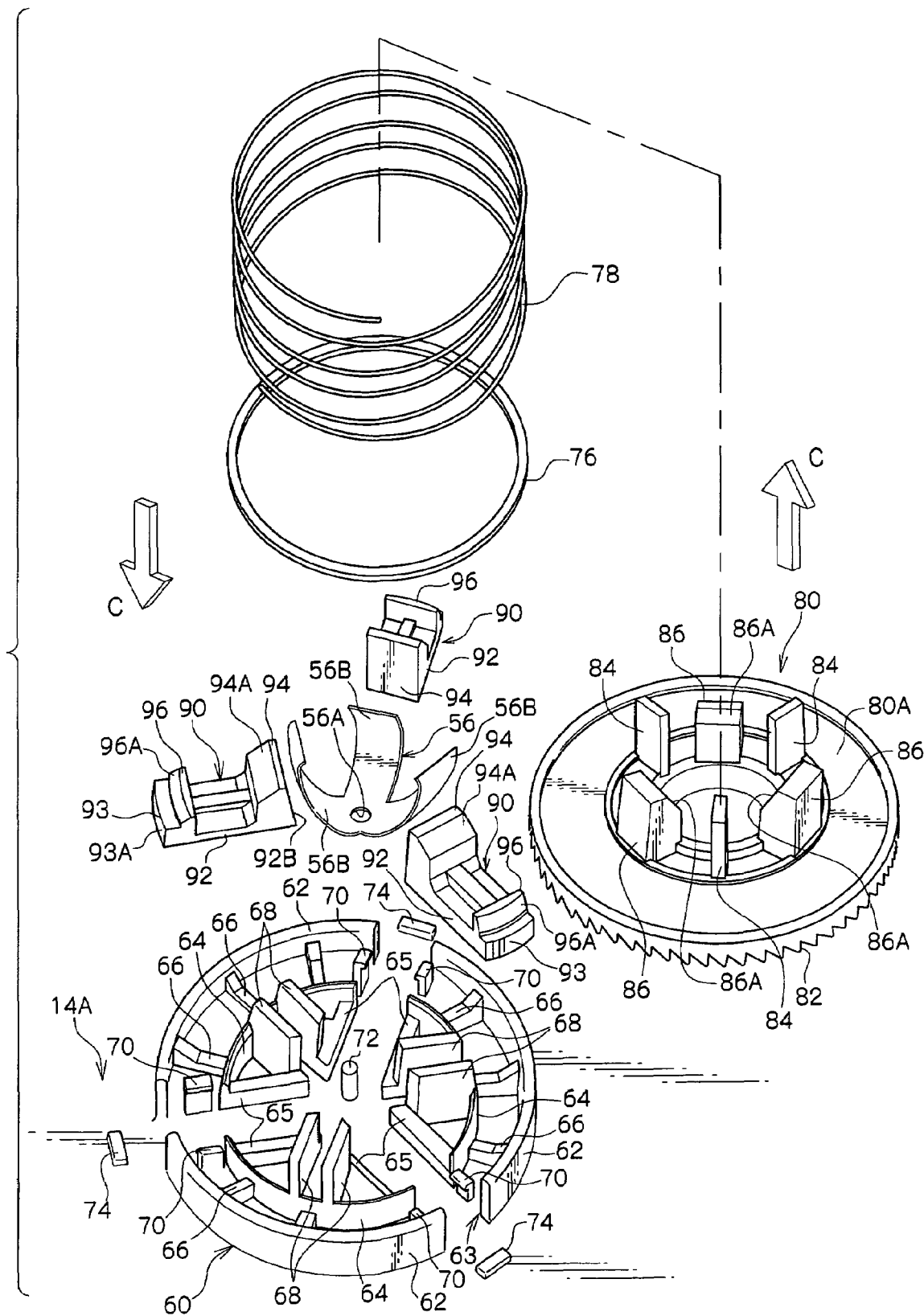
FIG. 4 is an exploded perspective view of a reel locking mechanism structuring the recording tape cartridge relating to the embodiment of the present invention.

As shown in FIGS. 2 through 4, the recording tape cartridge 10 has the braking member 80 which impedes rotation of the reel 40 with respect to the case 12. The braking member 80 is formed in the shape of a disc. The braking gear 82, which can mesh with the engaging gear 54 of the reel 40, is formed at the outer peripheral portion of the bottom surface of the braking member 80. The braking member 80 is inserted in the cylindrical tube portion 42A of the reel hub 42 substantially coaxially and so as to be movable in the vertical (axial) direction.

A plurality of (three in the present embodiment) guide pieces 84 project in a radial form in plan view from the top surface of the braking member 80. Due to the guide pieces 84 being inserted between guide wall portions 68 (which will be described later) of the case 12, the braking member 80 is supported so as to be unable to rotate with respect to the case 12. Further, the guide pieces 84 are guided in the vertical direction by the guide wall portions 68.

The braking member 80 can assume a rotation locking position (see FIG. 2), at which the braking gear 82 meshes with the engaging gear 54 such that rotation of the reel 40 with respect to the case 12 is impeded, and a rotation permitting position (see FIG. 3), at which the braking member 80 moves upward from the rotation locking position such that the meshing-together of the braking gear 82 and the engaging gear 54 is released and rotation of the reel 40 with respect to the case 12 is permitted.

Specifically, a compression coil spring 78 is disposed in a compressed state between the ceiling plate 14A of the case 12 (details will be described later) and a spring receiving surface 80A which is the top surface of the braking member 80 at the outer side of the guide pieces 84. The braking member 80 is always urged toward the rotation locking position by the urging force of the compression coil spring 78. Further, due to the urging force of the compression coil spring 78, the reel 40 is positioned at its lowermost position, the braking member 80 is positioned at the rotation locking position, and the braking gear 82 is meshed with the engaging gear 54.

An operation projection 88 projects from the axially central portion of the bottom surface of the braking member 80. In the state in which the braking member 80 is positioned at the rotation locking position, the operation projection 88 is disposed in the through hole 55 of the reel 40. Due to the operation projection 88 being pushed by the releasing projection 104 of the rotating shaft 100, the braking member 80 moves from the rotation locking position to the rotation permitting position. More specifically, as the rotating shaft 100 approaches the reel 40 along the axial direction in order to make the driving gear 102 mesh with the reel gear 50, the releasing projection 104, which projects further upwardly than the driving gear 102 from the axially central portion of the rotating shaft 100, pushes the operation projection 88, and moves the braking member 80 to the rotation permitting position. Further, the rotating shaft 100 moves the reel 40 to the raised position, in the state in which the positioning surface 108 abuts the reference surface 48A of the reel 40.

The braking member 80 has engaging projections 86 which project from the top surface of the braking member 80 in order to move locking members 90, which will be described later, from restricting positions to restriction releasing positions, due to the braking member 80 moving from the rotation locking position to the rotation permitting position. The structures of the engaging projections 86 will be described together with the locking members 90.

As shown in FIGS. 2 through 4, the recording tape cartridge 10 has the locking members 90 which are for preventing vertical movement of the reel 40 with respect to the case 12, i.e., for preventing the annular rib 46C from moving away from the abutment surface 16C. A plurality of (three in the present embodiment) the locking members 90 are provided. When the locking members 90 are described hereinafter, the respective directions at the time when the locking members 90 are in their assembled states will be used. Further, in the following explanation, when the term "radial direction" is used, there are cases in which it refers to the radial direction of the reel 40 accommodated in the case or to a direction parallel to that direction.

Figure 6:
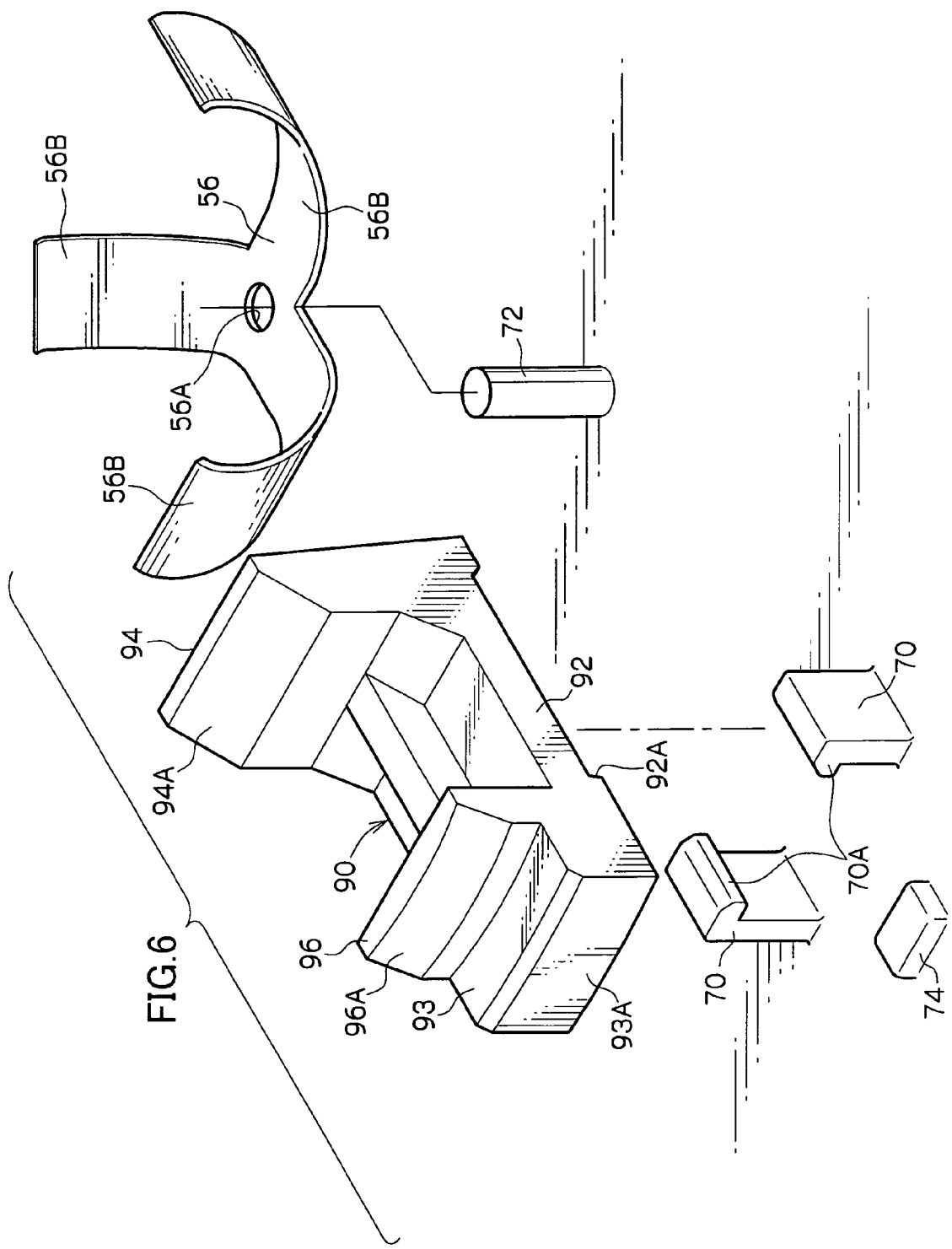
FIG. 6 is a perspective view showing a process of assembling a locking member and a plate spring structuring the recording tape cartridge relating to the embodiment of the present invention.

As shown in FIG. 6, each of the locking members 90 has a main body portion 92 which is formed substantially in the shape of a rectangular column whose longitudinal direction runs along the radial direction, and which slidably contacts the ceiling plate 14A. A lock portion 93 is provided at the radial direction outer end of the main body portion 92. As shown in FIG. 8, the top surface of the lock portion 93 is flush with the top surface of the main body portion 92. A vertical direction thickness D of the lock portion 93 is substantially the same as or is slightly smaller than distance W of the gap G between the inner surface of the ceiling plate 14A and the top end surface of the cylindrical tube portion 42A of the reel 40 which is positioned at the lowermost position (see FIGS. 9, 10, 12).

The locking members 90 are structured so as to, by moving in the radial direction while sliding along the ceiling plate 14A, be able to assume restricting positions (see FIG. 2), at which the lock portions 93 enter into the gap G and the reel 40 is restricted from rising from its lowermost position, and restriction releasing positions (see FIG. 3), at which the lock portions 93 withdraw from the gap G such that movement of the reel 40 from the lowermost position to the raised position is permitted. Note that thinned portions 92A are formed in the top surface of the main body portion 92 at both transverse direction sides, so as to reduce the sliding resistance between the ceiling plate 14A and the locking member 90.

An engaging portion 96, which projects downward from the radial direction inner end portion of the lock portion 93 at the main body portion 92, is provided at each of the locking members 90. The radial direction outer surface of the engaging portion 96 is formed in an arc-shape which corresponds to the inner peripheral surface of the cylindrical tube portion 42A. When the locking members 90 are positioned at their restricting positions, these radial direction outer surfaces of the engaging portions 96 planarly-contact the inner peripheral surface of the cylindrical tube portion 42A. In this way, movement of the locking members 90 toward the radial direction outer side past their restricting positions is prevented. Note that the drafts, along the reel axial direction, of the engaging portion 96 and (at least the vicinity of the top end of) the cylindrical tube portion 42A are substantially 0°, such that no gap is formed therebetween. Further, a taper surface 96A, which is arc-shaped in bottom view and which is directed downwardly and outwardly in the radial direction, is formed at the lower end portion of each engaging portion 96, and is used for the assembling-in of the locking member 90 as will be described later.

Each locking member 90 has a cam portion 94 which projects downwardly from the radial direction inner end of the main body portion 92. In cooperation with the engaging projections 86 of the braking member 80, the cam portions 94 convert a portion of the moving force of the braking member 80 from the rotation locking position to the rotation permitting position, into moving force of the locking members 90 from the restricting positions to the restriction released positions. These structures will be described later.

Figure 5:
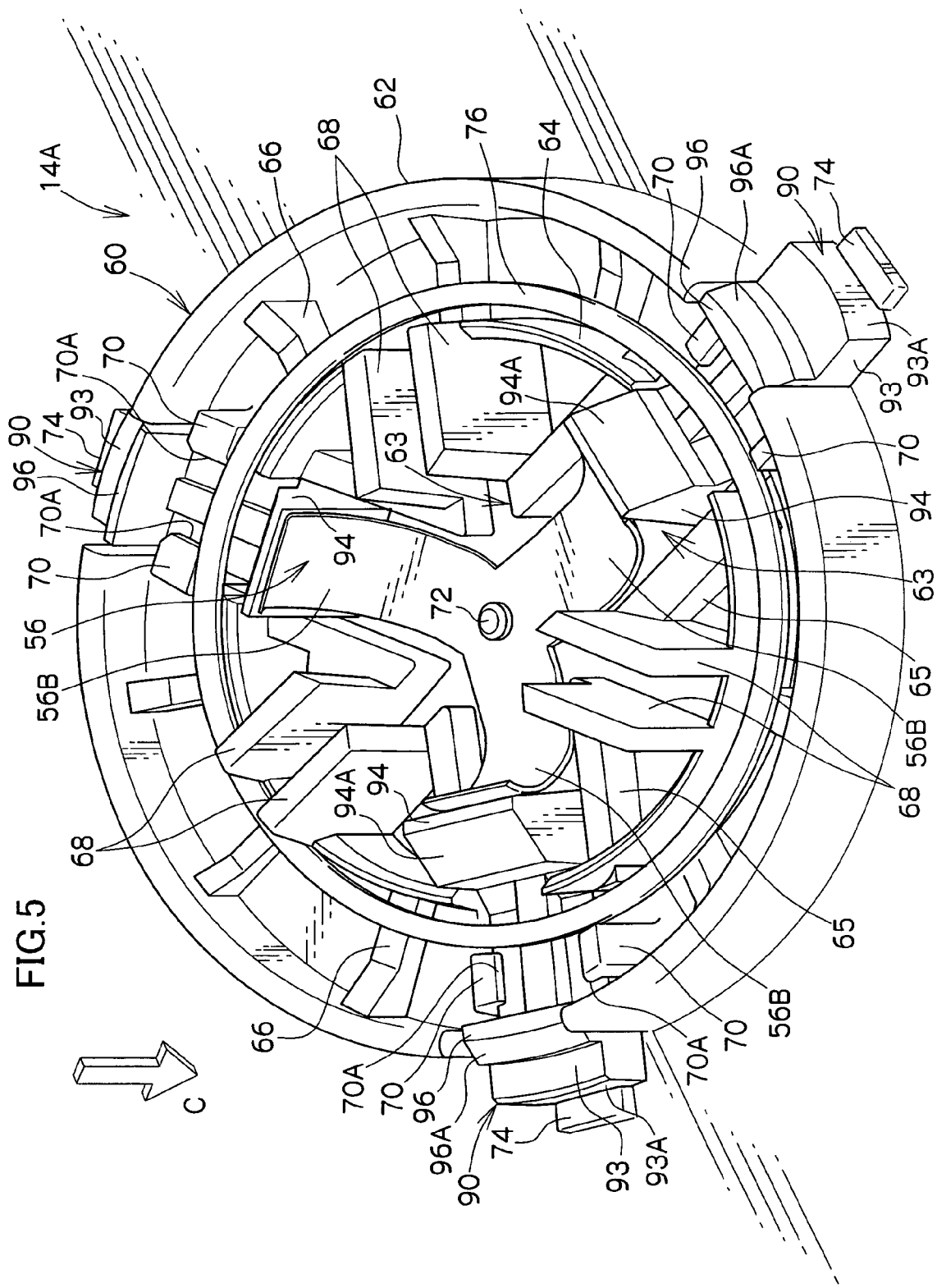
FIG. 5 is a perspective view showing a provisionally-assembled state of the reel locking mechanism structuring the recording tape cartridge relating to the embodiment of the present invention.

The above-described locking members 90 are held, so as to be movable in the radial direction, by a holding portion 60 provided at the ceiling plate 14A of the case 12. As shown in FIGS. 4 and 5, the holding portion 60 has annular walls 62, 64 which stand erect at the inner surface of the ceiling plate 14A, and which are substantially coaxial with the reel 40 in the assembled state. The annular wall 62, which is positioned at the outer side, has a standing height from the ceiling plate 14A which is greater than that of the annular wall 64 at the inner side (i.e., the bottom end of the annular wall 62 is positioned further downward than the bottom end of the annular wall 64). The outer diameter of the annular wall 62 is smaller than the inner diameter of the cylindrical tube portion 42A of the reel 40, and the holding portion 60 does not interfere with the reel 40 which is positioned at the raised position.

Three places of the annular walls 62, 64, which correspond to one another and are at uniform intervals in the peripheral direction, are cut-out along the entire heights thereof, such that cut-out portions 62A, 64A are formed. The opening widths of the cut-out portions 62A, 64A correspond to the widths of the locking members 90. The annular walls 62, 64 are connected by plural supporting ribs 66 which project from the ceiling plate 14A. In the present embodiment, three of the supporting ribs 66 are provided between each of the cut-out portions 62A, 64A, such that a total of nine of the supporting ribs 66 are provided.

The holding portion 60 has three pairs of guide walls 65 which stand erect from the ceiling plate 14A and are positioned at the inner side of the annular wall 64. Each pair of guide walls 65 is disposed such that, in bottom view, the opposing surfaces thereof coincide with imaginary lines connecting the edge portions of the cut-out portions 62A, 64A. Each pair of guide walls 65, together with the cut-out portions 62A, 64A, forms an accommodating portion 63 which accommodates the locking member 90 such that the locking member 90 is movable in the radial direction. Namely, in the state in which the locking members 90 are accommodated in the respectively different accommodating portions 63, the locking members 90 move in the radial direction while being guided by the guide walls 65 and the edge portions of the cut-out portions 62A, 64A.

Holding projections 70 project between the annular walls 62, 64 and between the edge portions of the cut-out portions 62A, 64A. Each holding projection 70 is positioned on an imaginary line extending from the corresponding guide wall 65. An engaging convex portion 70A, which juts out at the lower side of the accommodating portion 63, is provided at the bottom end of each holding projection 70. The bottom end of each engaging convex portion 70A at the side facing its partner engaging convex portion 70A is a taper surface. When the locking member 90 is assembled in from below, the taper surfaces engage with the corner portions of the main body portion 92. In this way, when the locking member 90 is assembled in, the pair of holding projections 70 deform and permit installation of the locking member 90 into the accommodating portion 63, and the engaging convex portions 70A impede the falling-out of the locking member 90 in this installation. Namely, even if the ceiling plate 14A is made to face downward (in the vertical direction), the locking members 90 are in provisionally held states in which they do not fall out from the holding portion 60.

A pin 72 for caulking projects at the axially central portion of the holding portion 60. The pin 72 for caulking is for fixing of a plate spring 56 which serves as an urging member and which will be described later. Further, stopper ribs 74 project from the ceiling plate 14A at the outer side of the annular wall 62, along a circumference which is coaxial with the annular wall 62. The stopper ribs 74 are disposed at the radial direction outer sides of the accommodating portions 63, respectively, and are for provisionally stopping the locking members 90. The stopper ribs 74 are disposed slightly further toward the radial direction outer side than the radial direction outer ends of the lock portions 93 of the locking members 90 which are positioned at the restricting positions. The distance between the stopper rib 74 and the radial direction outer end of the lock portion 93 in this state is slightly smaller than the length of the taper surface 96A as projected on a horizontal plane (a plane orthogonal to the axis of the reel). Further, the heights by which the stopper ribs 74 project out from the ceiling plate 14A are kept low such that the stopper ribs 74 do not interfere with the reel 40 which is positioned at the raised position.

One set of two of the guide wall portions 68 stands erect from the region between each pair of the guide walls 65, at the inner side of the annular wall 64 of the ceiling plate 14A. Namely, there are three sets of, or a total of six of, the guide wall portions 68. The guide plates 84 of the braking member 80 enter between the guide wall portions 68 of the respective sets. The opposing interval between the guide wall portions 68 of each one set is equivalent to or slightly larger than the thickness of the guide piece 84, so as to impede rotation of the braking member 80 and suppress joggling. The guide wall portions 68 are of heights such that they can always maintain the state in which the guide pieces of the braking member 80, which moves between the rotation locking position and the rotation permitting position, are inserted therein. The radial direction inner ends of the guide wall portions 68 are continuous with the guide walls 65. The radial direction outer ends of the guide wall portions 68 are continuous with the annular wall 64.

The above-described holding portion 60 may be structured by a plate-shaped member which is separate from the ceiling plate 14A and is mounted to the ceiling plate 14A. If the holding portion 60 is structured in this way, there are advantages such as the locking members 90 and the holding portion 60 can be formed as a module, which allows for a mold to be used in common also for, for example, the case 12 (the upper case 14) and the recording tape cartridge which do not have the locking members 90. Further, in the above-described structure, because the engaging convex portions 70A of the holding projections 70 form undercut structures, it is difficult to make the engaging convex portions 70A large. However, the formation of an undercut structure can be avoided by providing a through hole between the holding projections 70 at the above-described plate-shaped member. In this structure, the engaging convex portions 70A are made to be large, and there is no need for a ring-shaped stopper 76 which will be described later. Further, the ring-shaped stopper 76 is not needed even if only the holding projections 70 are attached later as members which are separate from the upper case 14.

The respective locking members 90 are accommodated in the different accommodating portions 63 of the above-described holding member 60. In this way, the locking members 90 are disposed at uniform intervals in the peripheral direction of the reel 40, and are guided so as to be able to move only in the radial direction while sliding on the ceiling plate 14A. In this state, the locking members 90 are actually pressed by the ring-shaped stopper 76 which is fixed to the respective supporting ribs 66, such that the locking members 90 are reliably impeded from falling-out from the holding portion 60. The ring-shaped stopper 76 is fixed to the bottom surfaces of the respective supporting ribs 66 by ultrasonic welding for example. In the present embodiment, the ring-shaped stopper 76 is also used as a spring receiving portion which receives the top end of the compression coil spring 78. Note that the top end of the compression coil spring 78 may be received by the respective supporting ribs 66.

The plate spring 56 is mounted to the axially central portion of the holding portion 60. As shown in FIG. 6, the plate spring 56 is structured to have a pin hole 56A which is provided at the axially central portion thereof and through which the pin 72 for caulking is inserted, and three spring pieces 56B which are curved downward in a radial form from the axially central portion. As shown in FIG. 6, the pin 72 for caulking is inserted through the pin hole 56A and the axially central portion of the plate spring 56 is made to abut the ceiling plate 14A, such that the respective spring pieces 56B are positioned between the respective guide wall 65 pairs as seen in bottom view. By caulking the pin 72 for caulking in this state, the plate spring 56 is fixed to the holding portion 60. Note that the plate spring 56 may be mounted before the assembling-in of the locking members 90 and the ring-shaped stopper 76, or may be mounted after the assembling-in of the locking members 90 and the ring-shaped stopper 76.

The plate spring 56 urges the locking members 90 outwardly in the radial direction due to the spring pieces 56B, in a state of being deformed inwardly, abutting the surfaces of the cam portions 94 of the locking members 90 which surfaces face inwardly in the radial direction. In the state before the upper case 14 and the lower case 16 are joined together, the radial direction outer ends of the lock portions 93 of the locking members 90 abut the stopper ribs 74 due to the urging force of the plate spring 56 (see FIG. 5). Here, the surfaces of the cam portions 94 of the locking members 90, which surfaces face inwardly in the radial direction and are abutted by the spring pieces 56B, are structured so as to be inclined by a predetermined angle with respect to the vertical direction (the axial direction of the reel) and slightly face downward.

Therefore, the locking members 90 are urged outwardly in the radial direction, and are weakly urged upwardly as well. In this way, the top surfaces of the locking members 90 are pushed against the ceiling plate 14A, and the lock portions 93 of the locking members 90 reliably enter into the gap G. In other words, the difference between the distance W of the gap G and the thickness D of the lock portion 93 is made to be small, and upward and downward movement of the reel 40 can be restricted so as to be even smaller. Further, in a case in which the ring-shaped stopper 76 is assembled-in after the plate-shaped spring 56, the upwardly-directed urging force of the plate spring 56 effectively prevents the locking members 90 from falling-out. A predetermined clearance (about 0.05 mm to 0.4 mm) is ensured between the ring-shaped stopper 76 and the bottom surfaces of the locking members 90 (the main body portions 92) which are pushed against the ceiling plate 14A as described above, and sliding resistance is not generated therebetween.

When the upper case 14 in this state is assembled to the lower case 16 in which the reel 40, whose engaging gear 54 is meshed together with the braking gear 82 of the braking member 80 at which the compression coil spring 78 is placed, is positioned at the lowermost position, while the inner edge portion of the top end of the cylindrical tube portion 42A engages with the taper surfaces 96A of the locking members 90, a portion of the assembly force in the reel axial direction is converted into moving force moving the locking members 90 toward the inner side in the radial direction. The locking members 90 move from the above-described provisionally held positions to the restricting positions against the urging force of the plate spring 56. Due to this operation, the braking member 80 is positioned before assembly, such that the respective guide pieces 84 of the braking member 80 are disposed between the corresponding guide wall portions 68. Further, due to this operation, the door 30 is shaft-supported by the supporting shaft 26. By fixedly joining the upper case 14 and the lower case 16 together in this state, the recording tape cartridge 10 is assembled.

Figure 9:
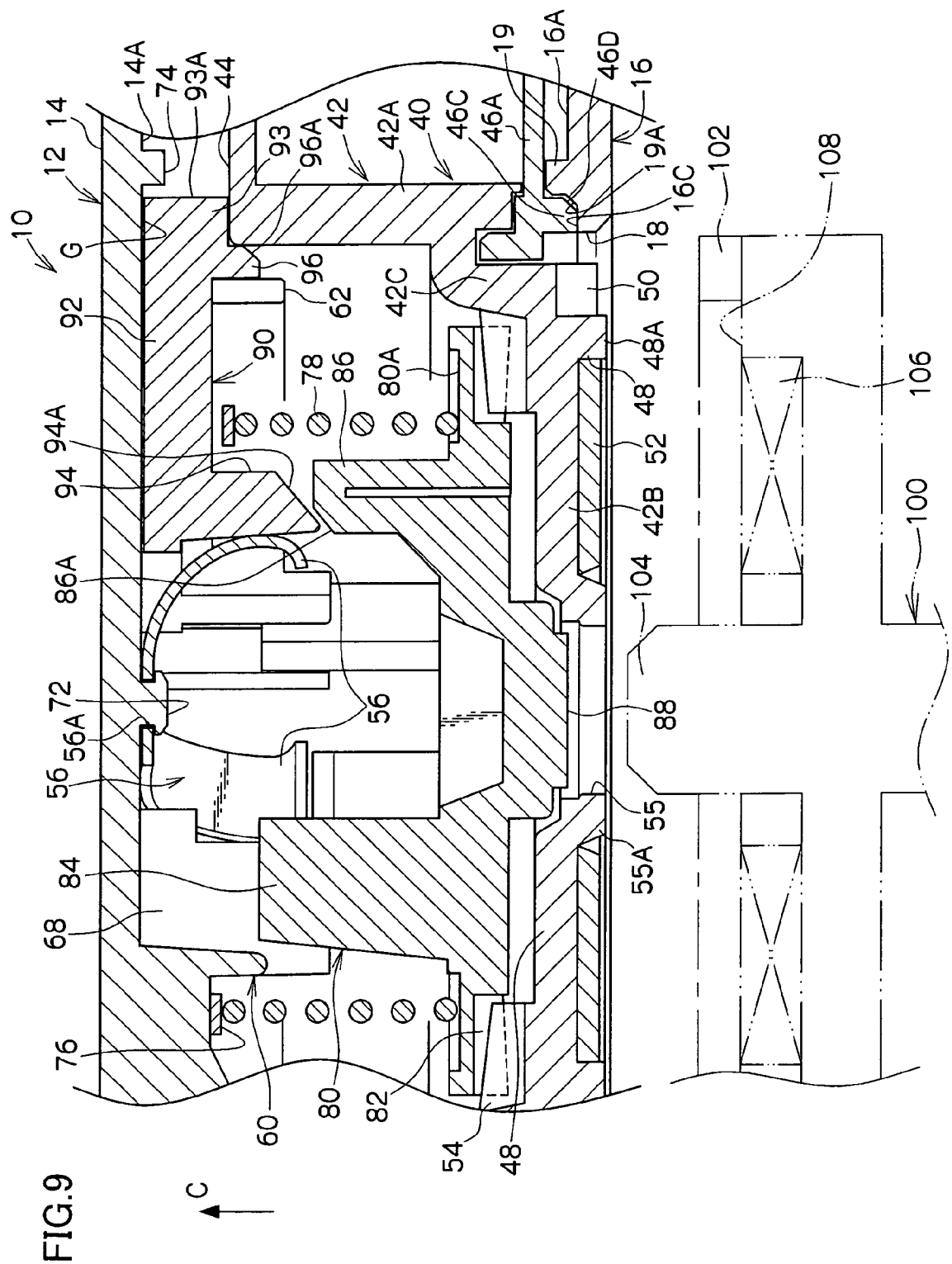
FIG. 9 is a side sectional view showing, in an enlarged manner, the state in which the recording tape cartridge relating to the embodiment of the present invention is not in use.

In the shipment state which is this assembled state, i.e., the state of non-use, as shown in FIGS. 2 and 9, the reel 40 is positioned at the lowermost position due to the urging force of the compression coil spring 78, the braking member 80 is positioned at the rotation locking position due to the urging force of the compression coil spring 78, and the locking members 90 are positioned at the restricting positions due to the urging force of the plate spring 56. Accordingly, rotation of the reel 40, which is positioned at the lowermost position, with respect to the case 12 is impeded by the braking member 80, and axial direction movement of the reel 40 with respect to the case 12, i.e., movement of the reel 40 toward the raised position, is restricted by the locking members 90. This state of the recording tape cartridge 10 is called the state of non-use.

At the recording tape cartridge 10, as described above, due to the braking member 80 moving from the rotation locking position to the rotation permitting position due to the rotating shaft 100, the locking members 90 move from the restricting positions to the restriction releasing positions. Specifically, as shown in FIG. 5, taper surfaces 86A, which face upwardly and toward the radial direction inner side, are formed at the top ends of the engaging projections 86 which project out from the top surface of the braking member 80. Further, taper surfaces 94A, which face downwardly and toward the radial direction inner side, are formed at the bottom ends of the cam portions 94 which project downwardly from the radial direction inner ends of the locking members 90. The taper surfaces 86A and the taper surfaces 94A are mutually corresponding angles of inclination which can planarly contact one another. The angles of inclination are set within a range of 30° to 60°, and are 45° in the present embodiment.

Figure 10:
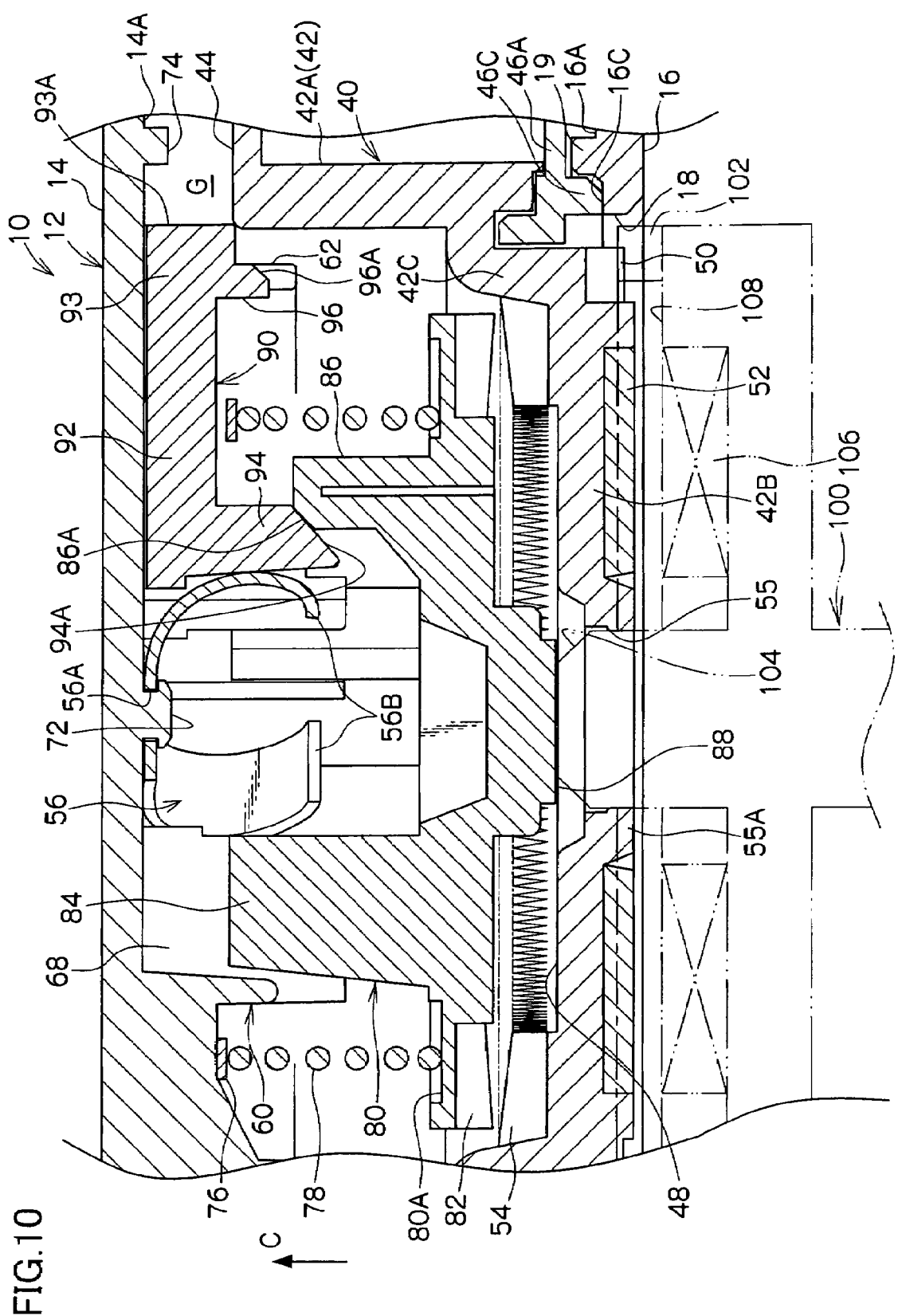
FIG. 10 is a side sectional view showing, in an enlarged manner, a reel locking releasing step of the recording tape cartridge relating to the embodiment of the present invention.
Figure 11:
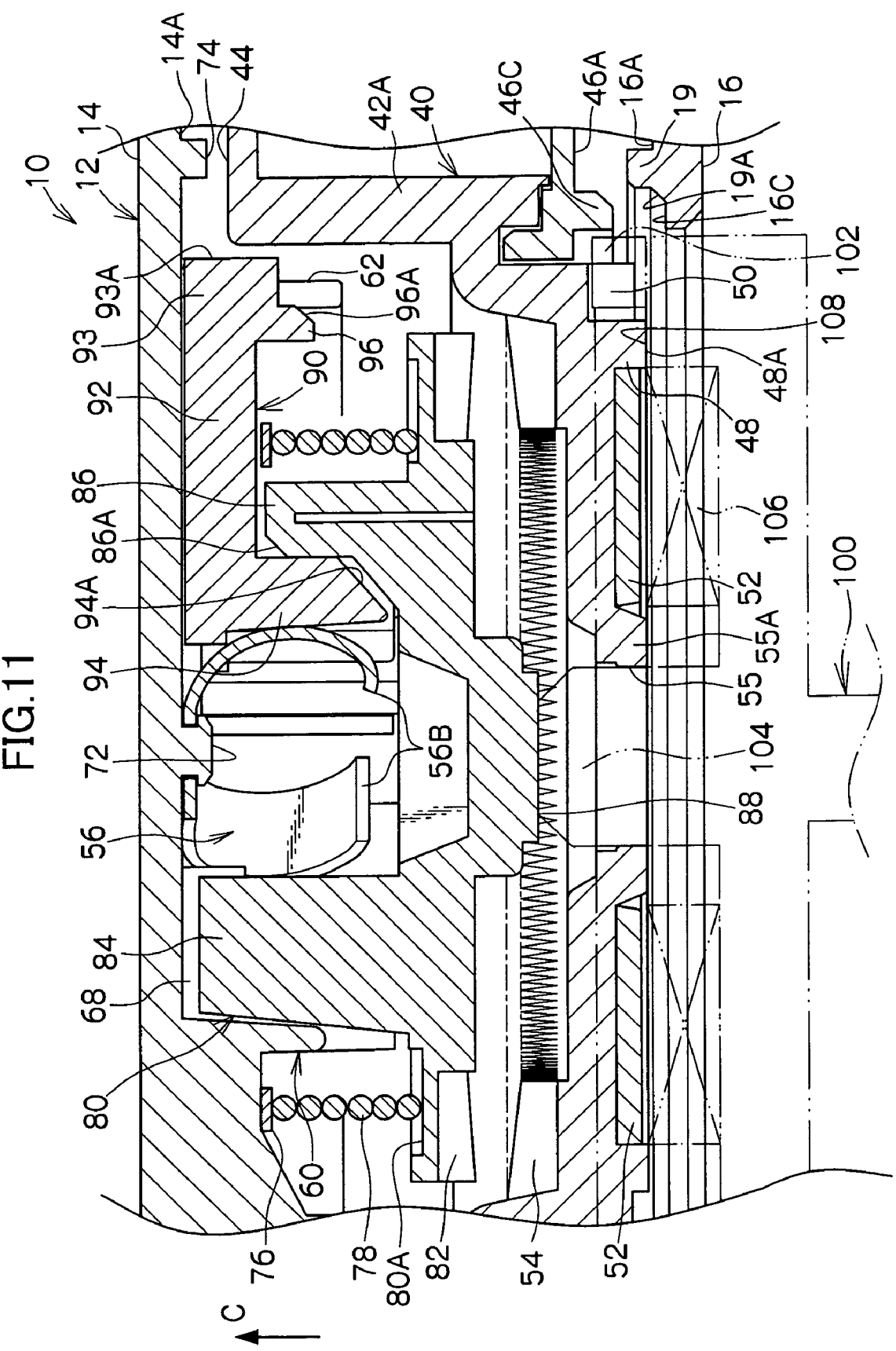
FIG. 11 is a side sectional view showing, in an enlarged manner, the state in which the reel of the recording tape cartridge relating to the embodiment of the present invention rotates.

In this way, when the braking member 80 moves upward with respect to the case 12, while the taper surfaces 86A and the taper surfaces 94A contact one another, the upward (toward the upper side in the axial direction of the reel) moving force of the braking member 80 is converted into moving force which moves the locking members 90 toward the inner side in the radial direction. In this way, as shown in FIGS. 3 and 11, and via the state shown in FIG. 10, the locking members 90 move to the restriction releasing positions, the braking member 80 moves to the rotation permitting position, and the reel 40 reaches the state of having moved to its raised position. The state of the recording tape cartridge 10 at this time is called the state of usage.

In this state of usage, the cam portions 94 of the locking members 90 are made to enter in at the inner sides of the corresponding engaging projections 86 of the braking member 80, and the surfaces of the cam portions 94, which surfaces face outwardly in the radial direction, are made to abut the surfaces of the corresponding engaging projections 86, which surfaces face inwardly in the radial direction. The drafts of the radial direction outwardly-facing surfaces of the cam portions 94 of the locking members 90 and the radial direction inwardly-facing surfaces of the engaging projections 86 of the braking member 80, are substantially 0°. In the state of usage, components of force in the axial direction of the reel 40 due to the urging forces of the compression coil spring 78 and the plate spring 56 do not arise.

As shown in FIG. 9, in the state of non-use, a predetermined clearance is set between the taper surface 94A of each cam portion 94 and the taper surface 86A of each engaging projection 86. In this way, in the state of non-use, the components of force of the urging force of the plate spring 56 are prevented from being applied to the braking member 80. Further, this clearance (distance of separation along the axial direction of the reel) is smaller than the amount of meshing, along the reel axial direction, between the braking gear 82 and the engaging gear 54. Namely, before the meshing-together of the braking gear 82 and the engaging gear 54 is released, the taper surfaces 86A, 94A interfere with one another. In this way, the rotation locked state of the reel 40 is prevented from being inadvertently released due to the impact of a drop or the like.

Next, the state in which axial direction movement of the reel 40 is restricted by the locking members 90 will be described in detail. As shown in FIG. 8, a length L, along the radial direction, of the lock portion 93 is less than or equal to the thickness tr, along the radial direction, of the cylindrical tube portion 42A of the reel 40. Accordingly, radial direction outer ends 93A of the lock portions 93 of the locking members 90 positioned at their restricting positions, are positioned within the range of the thickness tr of the cylindrical tube portion 42A. In the state in which the locking members 90 are positioned at the restricting positions, the radial direction outer ends 93A of the lock portions 93 are positioned further toward the radial direction outer side than the inner surface (inner diameter di) of the annular rib 46C of the reel 40. Note that the length L is set such that, in a case in which the inner diameter of the gear opening 18 of the case 12, i.e., the diameter of the inner edge of the abutment surface 16C, is greater than the inner diameter di of the annular rib 46C, the radial direction outer ends 93A of the lock portions 93 of the locking members 90, which are positioned at the restricting positions, are positioned further toward the radial direction outer side than the inner edge of the abutment surface 16C.

Accordingly, the abutment surface 16C of the case 12 and the lock portions 93 of the locking members 90 positioned at the restricting positions are positioned so as to overlap one another in the radial direction of the reel 40 (so as to overlap when projected in the reel axial direction), within the range of the thickness tr of the cylindrical tube portion 42A. Because the abutment surface 16C is annular (has an endless shape), the abutment surface 16C and the lock portions 93 overlap one another also in the peripheral direction of the cylindrical tube portion 42A, within the range of the thickness Tr. In other words, the region of the reel 40 that attempts to move toward the ceiling plate 14A and abuts the lock portion 93, and the region of the reel 40 that attempts to move toward the floor plate 16A and abuts the abutment surface 16C, overlap one another in the peripheral direction and the radial direction of the cylindrical tube portion between the inner and outer peripheral surfaces of the cylindrical tube portion 42A (within the range of the thickness Tr), as seen from the axial direction of the reel 40.

As described above, in the state of non-use of the recording tape cartridge 10, among the respective surfaces of the reel 40 which face upward or downward, only the top end surface of the cylindrical tube portion 42A and the bottom end surface of the annular rib 46C, which are positioned within the range of the thickness tr of the cylindrical tube portion 42A (between the inner and outer peripheral surfaces), are made to abut or are made to extremely closely approach the lock portions 93 of the locking members 90 and the abutment surface 16C of the case 12, respectively. Namely, when the reel 40 attempts to move upward or downward, the vertical direction movement restricting force which restricts this upward or downward movement is applied only to portions of the reel 40, which portions are within the range of the thickness tr of the cylindrical tube portion 42A. Moreover, as described above, the lock portions 93 of the locking members 90 positioned at the restricting positions overlap the abutment surface 16C of the case 12 within the range of the thickness tr. Therefore, the aforementioned moving restricting force does not generate a couple of forces which tilts the reel 40 with respect to the case 12 (there is no need to shifted a couple of forces by providing plural lock portions 93).

Next, operation of the present embodiment will be described.

When the recording tape cartridge 10 having the above-described structure is in the state of non-use such as is being stored or transported or the like (i.e., when the recording tape cartridge 10 is not loaded in a drive device), the door 30 closes the opening 20 due to the urging force of the torsion spring 28. Further, the leader tape 22 is disposed along the left side wall 12B due to the jutting portions 22B being accommodated (inserted) and held within the accommodating portions 24.

Due to the urging force of the compression coil spring 78, the reel 40 is positioned at the lowermost position at which the bottom end surface of the annular rib 46C abuts the abutment surface 16C of the case 12, and the braking member 80 is positioned at the rotation locking position at which the braking gear 82 is made to mesh with the engaging gear 54 of the reel 40. Further, due to the urging force of the plate spring 56, the respective locking members 90 are positioned at the restricting positions at which the lock portions 93 thereof are disposed in the gap G between the ceiling plate 14A and the top end surface of the cylindrical tube portion 42A. Namely, as shown in FIGS. 2 and 9, the recording tape cartridge 10 is in the state of non-use.

For these reasons, rotation of the reel 40 with respect to the case 12 is impeded, and upward and downward movement of the reel 40 with respect to the case 12 is restricted to less than or equal to an allowable amount (an amount which is sufficiently smaller than the amount of movement from the lowermost position to the raised position). Accordingly, even if the user carelessly pushes the floor portion of the reel 40 (including the reel plate 52) or drops the recording tape cartridge 10, joggling and tilting (i.e., a change in the posture) of the reel 40 within the case is prevented or suppressed. Note that, in a structure in which the spring constant of the compression coil spring 78 is set to be low, if the recording tape cartridge 10 is stored or the like with the floor plate 16A facing upward in the vertical direction, there are cases in which the annular rib 46C of the reel 40 and the abutment surface 16C of the case 12 are separated within a range which is less than or equal to the aforementioned allowable amount. However, in such cases as well, upward and downward movement (axial direction movement) of the reel 40 with respect to the case 12 is, of course, restricted to the aforementioned allowable amount or less.

When the magnetic tape T is to be used, the recording tape cartridge 10 is loaded, from the front wall 12A side thereof, into a bucket (not illustrated) of a drive device. Accompanying this loading operation, an opening/closing member (not illustrated) of the drive device pushes the portion of the door 30 which portion is further toward the right than the supporting shaft 26. Thus, the door 30 rotates around the supporting shaft 26 against the urging force of the torsion spring 28, and the opening 20 is opened.

Next, with the opened state of the opening 20 being maintained, the bucket is lowered, and the rotating shaft 100 of the drive device relatively approaches the case 12 from beneath (moves upward with respect to the case 12). Thus, as shown in FIG. 10, while the releasing projection 104 of the rotating shaft 100 pushes the operation projection 88 of the braking member 80, the releasing projection 104 enters into the through hole 55 of the reel 40 and fits-together therewith. In this way, the braking member 80 is pushed upward against the urging force of the compression coil spring 78 (moves to a released position relative to the reel 40), such that the state in which rotation of the reel 40 is locked by the braking member 80 is cancelled.

Accompanying this upward movement of the braking member 80, the taper surfaces 86A of the engaging projections 86 of the braking member 80 and the taper surfaces 94A of the cam portions 94 of the locking members 90, while sliding along one another, convert the upward moving force of the braking member 80 into moving force of the locking members 90 toward the radial direction inner side. In this way, the locking members 90 move from the restricting positions toward the restriction releasing positions.

When the rotating shaft 100 moves further upward, while the rotating shaft 100 pushes the braking member 80 further upward, the driving gear 102 meshes with the reel gear 50. In this way, before the reference surface 48A of the reel 40 abuts the positioning surface 108 of the rotating shaft 100, the lock portions 93 of the locking members 90 are completely pulled-out from the gap G (move to released positions relative to the reel 40). When the positioning surface 108 of the rotating shaft 100 abuts the reference surface 48A of the reel 40, the rotating shaft 100 moves further upward together with the reel 40 and the braking member 80.

Then, when the bucket moves downward by a set stroke and stops, movement of the rotating shaft 100 with respect to the case 12 stops. As shown in FIGS. 3 and 11, in the axial direction of the reel 40, the reference surface 48A thereof abuts the positioning surface 108, and the reel 40 is positioned at a rotatable position at which it is raised up within the case 12. In this state, the reel 40 is held at the rotating shaft 100 due to the attraction force by which the magnet 106 attracts the reel plate 52.

In this state, the braking member 80, whose operation projection 88 is abutting the releasing projection 104, is held at the rotation permitting position (the absolute rotation permitting position with respect to the case 12). Further, due to the releasing projection 104 fitting-together with the through hole 55 as described above, the reel 40 is centered with respect to the rotating shaft 100. The respective locking members 90 position the cam portions 94 thereof at the inner sides of the corresponding engaging projections 86 of the braking member 80 which is held at the aforementioned rotation permitting position (i.e., the locking members 90 are positioned at the absolute restriction releasing positions with respect to the case 12), such that movement of the locking members 90 toward the radial direction outer side, i.e., toward the restricting positions, is reliably impeded.

Then, an unillustrated pull-out member of the drive device approaches the opening 20 from the left side wall 12B side, and engages with the hole 22A of the leader tape 22. At this time, because the leader tape 22 is standing-by in a state of being adjacent to the left side wall 12B, the pull-out member can reliably engage the hole 22A. The pull-out member, which is engaging the hole 22A, moves away from the opening 20, pulls the leader tape 22 out from the case 12, and engages the leader tape 22 with an unillustrated take-up reel of the drive device such that the leader tape 22 can be taken-up thereon.

From this state, the drive device drives the take-up reel and the rotating shaft 100, i.e., the reel 40, to rotate synchronously. In this way, the magnetic tape T is successively fed out to the drive device. Then, recording of data onto the magnetic tape T or playback of data recorded on the magnetic tape T is carried out by a recording/playback head (not illustrated) which is disposed along a predetermined tape path of the drive device.

When the recording tape cartridge 10 is to be removed from the drive device, first, the driving gear 102 and the rotating shaft 100, i.e., the reel 40, are rotated reversely, and the magnetic tape T is rewound onto the reel 40. Then, the leader tape 22 is disconnected from the take-up reel and is returned to the interior of the case 12 from the opening 20. Namely, the jutting portions 22B of the leader tape 22 are accommodated (inserted) in the accommodating portions 24, and are held at predetermined positions within the case 12.

Next, the drive device raises the bucket, i.e., the recording tape cartridge 10. Thus, the meshed-together state of the reel gear 50 and the driving gear 102 is cancelled, the releasing projection 104 withdraws from the through hole 55, the abutment of the operation projection 88 and the releasing projection 104 is cancelled, and the braking member 80 returns, due to the urging force of the compression coil spring 78, to its rotation locking position at which the braking gear 82 meshes together with the engaging gear 54. At this time, due to the urging force of the compression coil spring 78, the reel 40 also moves downward and returns to its lowermost position. Further, due to the braking member 80 returning to the rotation locking position, the respective locking members 90 can move toward the radial direction outer side, and, due to the urging force of the plate spring 56, return to their restricting positions at which the lock portions 93 are disposed in the gap G In this state, the recording tape cartridge 10 is discharged from the bucket. Due to this discharging operation, the engaged state of the opening/closing member of the drive device and the door 30 is cancelled, and, due to the urging force of the torsion spring 28, the door 30 returns to the position of closing the opening 20. Accordingly, the recording tape cartridge 10 which is discharged from the bucket of the drive device is returned to its initial state in which the opening 20 is closed and rotation of and upward and downward movement of the reel are impeded.

Here, in the state in which the locking members 90 are positioned at the restricting positions and restrict axial direction movement of the reel 40, among the surfaces of the reel 40 which face toward the floor plate 16A, only the bottom end surface of the annular rib 46C, which is a portion positioned further toward the radial direction inner side than the outer peripheral surface of the cylindrical tube portion 42A, abuts the abutment surface 16C of the case 12. Therefore, when the reel 40 attempts to move in the axial direction, the movement restricting force, which restricts this movement, does not act on the lower flange 46A of the reel 40.

The lock portions 93 of the locking members 90, which are positioned at the restricting positions, abut only the portion further toward the inner side than the outer peripheral surface of the cylindrical tube portion 42A, among the surfaces of the reel 40, which is attempting to move upward, which surfaces face the ceiling plate 14A. Therefore, when the reel 40 attempts to move in the axial direction, the movement restricting force which restricts this movement does not act on the upper flange 44 of the reel 40.

In this way, even if the user carelessly pushes the floor portion (including the reel plate 52 or the like) of the reel 40 or drops the recording tape cartridge 10, the upper flange 44 and the lower flange 46A are prevented from interfering with the case 12 arid deforming. It is thereby possible to prevent the magnetic tape T, which is wound around the cylindrical tube portion 42A between the upper and lower flanges 44, 46A, from being damaged due to deformation of the flanges.

In particular, the annular rib 46C is positioned between the inner and outer peripheral surfaces of the cylindrical tube portion 42A as seen in the axial direction of the reel 40. Therefore, among the downward-facing surfaces of the reel 40 which is in a state in which the axial direction movement thereof is restricted by the locking members 90, the radial direction inner side portion of the cylindrical tube portion 42A does not abut the case 12. Further, the lock portions 93 of the locking members 90 positioned at the restricting positions abut only the top end surface of the cylindrical tube portion 42A of the reel 40 which is attempting to move upward. Therefore, among the upwardly-facing surfaces of the reel 40, the radial direction inner side portion of the cylindrical tube portion 42A does not abut the locking members 90. In this way, the vertical direction movement restricting force, which is applied when the reel 40 attempts to move in the vertical direction, is applied at the reel 40 only between the inner and outer peripheral surfaces of the cylindrical tube portion 42A which has high rigidity (i.e., within the range of the thickness tr). Therefore, deformation of the reel 40 accompanying the restriction of axial direction movement of the reel 40 can be reliably impeded.

Here, the locking members 90 positioned at the restricting positions and the abutment surface 16C of the case 12 have portions which overlap one another between the inner and outer peripheral surfaces of the cylindrical tube portion 42A, as seen from the axial direction of the reel 40. Therefore, the aforementioned movement restricting force is prevented from generating a couple of forces (a moment) which tilts the reel 40. In this way, when the locking members 90 are positioned at the restricting positions, the reel 40 tilting with respect to the case 12, i.e., a change in the posture of the reel 40 within the case 12, is reliably prevented. Thus, the magnetic tape T, whose end portion is connected to the leader tape 22 which is held in the case 12, is prevented from being damaged accompanying a change in the posture of the reel 40.

In this way, in the recording tape cartridge 10 relating to the present embodiment, it is possible to prevent the reel 40 from changing posture and from deforming within the case 12 at times when the recording tape cartridge 10 is not in use.

The above-described embodiment is a preferable structure in which only the annular rib 46C of the reel 40 which is positioned at the lowermost position abuts the abutment surface 16C of the case 12, and only the top end surface of the cylindrical tube portion 42A of the reel 40 abuts the lock portions 93 of the locking members 90. However, the present invention is not limited to the same, and may be structured, for example, as per the modified example described hereinafter.

Figure 12:
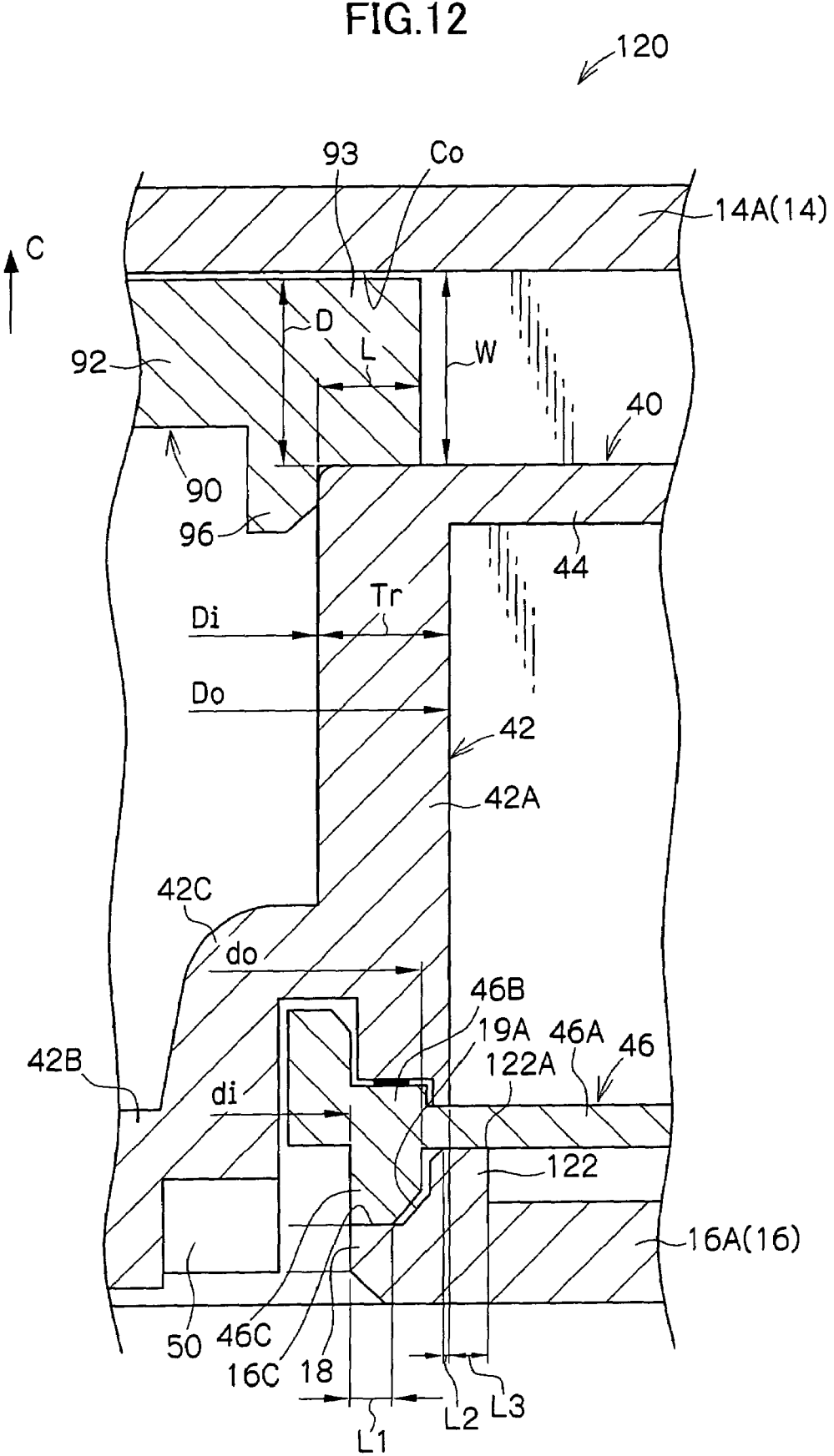
FIG. 12 is a sectional view corresponding to FIG. 8 and showing a modified example of the recording tape cartridge relating to the embodiment of the present invention.

Main portions of a recording tape cartridge 120 relating to a modified example are shown in FIG. 12 in a cross-sectional view corresponding to FIG. 8. As shown in FIG. 12, the recording tape cartridge 120 has an annular rib 122 in place of the annular rib 19 of the case 12. The annular rib 122 differs from the annular rib 19 with respect to the point that the annular rib 122 abuts the lower flange 46A of the reel 40 which is positioned at the lowermost position. Namely, the outer diameter of the annular rib 122 is larger than the outer diameter Do of the cylindrical tube portion 42A. Further, in the present modified example, the abutment surface 16C and a top end surface 122A of the annular rib 122 abut downwardly-facing surfaces of the reel 40 positioned at the lowermost position. Accordingly, the abutment surface 16C and the top end surface 122A correspond to the abutment portion in the present invention.

Moreover, in the present modified example, the sum of a length L1 and a length L2 is greater than a length L3. The length L1 is the length of the region of abutment of the annular rib 46C and the abutment surface 16C, along the radial direction of the reel 40. The length L2 is the length, along the radial direction of the reel 40, of the portion of the top end surface 122A which portion abuts the portion, at the lower flange 46A, further toward the radial direction inner side than the outer peripheral surface of the cylindrical tube portion 42A. The length L3 is the length, along the radial direction of the reel 40, of the portion of the top end surface 122A which portion abuts the portion, at the lower flange 46A, further toward the radial direction outer side than the outer peripheral surface of the cylindrical tube portion 42A. Accordingly, the movement restricting force at the time when the reel 40 attempts to move in the axial direction, is applied mainly to the portion of the reel 40 which portion is further toward the radial direction inner side than the outer peripheral surface of the cylindrical tube portion 42A (in this first modified example, between the inner and outer peripheral surfaces). Among this movement restricting force, the force which is applied to the lower flange 46A is mitigated.

In particular, in the present modified example, the sum of the abutment surface area of the annular rib 46C and the abutment surface 16C, and the surface area of the portion of the top end surface 122A which portion abuts the portion of the lower flange 46A further toward the radial direction inner side than the outer peripheral surface of the cylindrical tube portion 42A, is greater than the surface area of the portion of the top end surface 122A which portion abuts the portion of the lower flange 46A further toward the radial direction outer side than the outer peripheral surface of the cylindrical tube portion 42A. Among the above-described movement restricting force, the force which is applied to the lower flange 46A is mitigated.

As described above, in the structure relating to the present modified example, deformation of the reel 40 accompanying the restriction of axial direction movement of the reel 40, is impeded.

Further, in the present modified example as well, the locking members 90 positioned at the restricting positions and the abutment surface 16C of the case 12 have portions overlapping one another between the inner and outer peripheral surfaces of the cylindrical tube portion 42A, as seen from the axial direction of the reel 40. Therefore, the aforementioned movement restricting force is prevented from generating a couple of forces (a moment) which tilts the reel 40. Thus, when the locking members 90 are positioned at the restricting positions, the reel 40 tilting with respect to the case 12 (a change in the posture of the reel 40) is reliably prevented. In this way, it is possible to prevent the annular rib 122 from pushing and deforming the lower flange 46A as the reel 40 tilts.

Note that the above-described embodiment and modified example are preferable structures in which the abutment surface 16C is formed in an annular form along the edge portion of the gear opening 18. However, the present invention is not limited to the same, and, for example, the abutment surface 16C may be structured so as to be provided only at portions corresponding to the locking members 90. Conversely, a structure may be used in which the abutment surface 16C is formed in an annular form, and the annular rib 46C is divided in the peripheral direction. Further, the annular ribs 19, 122 of the case 12 can be formed so as to be divided in the peripheral direction.

In the above-described embodiment and modified example, the upper flange 44 is provided integrally with the reel hub 42. However, the present invention is not limited to the same, and may be structured such that, for example, the lower flange 46A is formed integrally with the reel hub 42, and the upper flange 44 is fixed to the top end surface of the cylindrical tube portion 42A by ultrasonic welding or the like. In this case, the lock portions 93 of the locking members 90 which are positioned at the restricting positions are disposed so as to abut the portion of the upper flange which portion is further toward the radial direction inner side than the outer peripheral surface of the cylindrical tube portion 42A. Accordingly, it suffices to provide a tubular portion, which fits into the cylindrical tube portion 42A, at the upper flange which is formed as a member separate from the reel hub 42.

The above-described embodiment and modified example are preferable structures in which the lock portions 93 of the locking members 90 positioned at the restricting positions and the abutment surface 16C of the case 12 overlap one another between the inner and outer peripheral surfaces of the cylindrical tube portion 42A. However, the present invention is not limited to the same, and may be structured such that the lock portions 93 and the abutment surface 16C do not overlap one another. Conversely, in the structure in which the lock portions 93 and the abutment surface 16C overlap one another between the inner and outer peripheral surfaces of the cylindrical tube portion 42A, for example, the lock portions 93 of the locking members 90 positioned at the restricting positions may be positioned so as to abut the upper flange 44 of the reel 40 which is attempting to move upward. Or, the surface area or length over which the lower flange 46A of the reel 40 abuts the floor plate 16A of the case 12 or a portion provided at the floor plate 16A, may be made to be larger than the surface area or length of abutment between the annular rib 46C and the abutment surface 16C.

Moreover, the embodiment and modified example which are described above are structured such that the bottom surfaces of the lock portions 93 of the locking members 90, the top end surface of the cylindrical tube portion 42A, the top surface of the abutment surface 16C of the case 12, and the bottom end surface of the annular rib 46C, are respectively surfaces which are orthogonal to the axis of the reel 40. However, the present invention is not limited to the same, and, for example, either the bottom surfaces of the lock portions 93 of the locking members 90 and the top end surface of the cylindrical tube portion 42A, or the top surface of the abutment surface 16C of the case 12 and the bottom end surface of the annular rib 46C, are taper surfaces which correspond to one another (conical surfaces).

In addition, the above-described embodiment and modified example are preferable structures in which the braking member 80 functions as switching member which is operated by the drive device and moves the locking members 90 from the restricting positions to the restriction releasing positions. However, the present invention is not limited to the same, and, for example, a separate switching member may be provided instead of the braking member 80. Or, external gears may be formed at the engaging portions 96 of the locking members 90, and an internal gear, which can mesh together with these external gears, may be formed at the inner peripheral surface of the cylindrical tube portion 42A, such that the locking members 90 also function as braking members.

The locking members 90 are urged toward the restricting positions by the urging force of the plate spring 56 in the above-described embodiment and modified example. However, the present invention is not limited to the same, and, for example, the locking members 90 may be urged by compression coil springs. Or, the movement from the restriction releasing positions to the restricting positions also may be carried out by operation of the drive device, and the locking members 90 may be held at the restricting positions by friction or the like.

Still further, the above embodiment and modified example are structured such that the locking members 90 can be set at their restricting positions and restriction releasing positions by moving in the radial direction of the reel 40. However, the present invention is not limited to the same. For example, the locking members 90 may be structured so as to assume their restricting positions and restriction releasing positions by moving in a direction intersecting the radial direction of the reel 40. Or, the locking members 90 may be structured so as to be able to be set at their restricting positions and restriction releasing positions by rotating around predetermined supporting points.

The reel 40 is structured so as to be shifted toward the its lowermost position by the urging force of the compression coil spring 78 in the above-described embodiment and modified example. However, the present invention is not limited to the same. For example, a force converting mechanism, such as a cam mechanism or the like which converts the moving force of the locking members 90 toward their restricting positions into shiftedting force of the reel 40 toward its lowermost position, may be provided between the reel 40 and the locking members 90. Namely, the locking members in the present invention are essentially the lock portions 93 of the locking members 90, and the present invention is not limited by the mechanism which moves the lock portions 93 between the restricting positions and the restriction releasing positions, the mechanism which shifteds the reel 40 toward the floor plate 16A side, and the like.

Moreover, the above-described embodiment and modified example are examples in which the opening 20 provided at the corner portion 12C of the case 12 is opened and closed by a hinge-type door 30, and the leader tape 22 serving as the leader member is connected to the distal end of the magnetic tape T. However, the present invention is, of course, not limited by the opening for the pulling-out of the magnetic tape T at the case 12, the covering member for opening and closing the opening, and the structure of the leader member. Further, the present invention is not limited to a structure in which the reel 40 has the reference surface 48A (the reference convex portion 48) which carries out axial direction positioning by abutting the positioning surface 108 of the rotating shaft 100. For example, axial direction positioning of the reel 40 may be carried out by the meshing-together of the reel gear 50 and the driving gear 102 which have tapered teeth which correspond to one another. In such a structure, centering of the reel 40 with respect to the rotating shaft 100 is carried out by the meshing-together of the reel gear 50 and the driving gear 102. Therefore, there is no need to form a structure in which the releasing projection 104 fits-together with the through hole 55.

In addition, the above-described embodiment is structured such that the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

The recording tape cartridge relating to the first aspect of the present invention may be structured such that, when the locking member is positioned at the restricting position, among the surfaces of the reel which face toward the floor plate, only a portion which is positioned between inner and outer peripheral surfaces of the hub as seen from the axial direction, abuts the case.

In the recording tape cartridge relating to the first aspect of the present invention, in the state in which the locking member is positioned at the restricting position and restricts axial direction movement of the reel, among the surfaces of the reel which face toward the floor plate, only the portion positioned between the inner and outer peripheral surfaces of the hub abuts the case. Therefore, at the floor plate side portion of the reel, the aforementioned moving restricting force is applied only within the range of the thickness of the hub which has high rigidity in the reel axial direction. In this way, deformation of the reel accompanying the restriction of movement of the reel can be reliably prevented.

The recording tape cartridge of the first aspect of the present invention may be structured such that, when the locking member is positioned at the restricting position, a portion of the locking member, which portion is abutted by the reel which is attempting to move toward the ceiling plate, is positioned only further toward the radial direction inner side than the outer peripheral surface of the hub.

In the recording tape cartridge of the present invention, the region of the locking member positioned at the restricting position, which region is abutted by the reel which is attempting to move toward the ceiling plate, is positioned only further toward the inner side than the outer peripheral surface of the hub at the reel. Therefore, when the reel attempts to move in the axial direction, the movement restricting force which restricts this movement is not applied to the portion of the ceiling plate side portion of the reel, which portion is further toward the outer side than the outer peripheral surface of the hub. In this way, when force moving the reel in the axial direction is applied at a time of non-use, the movement restricting force is not applied to, for example, the flange extending outwardly in the radial direction from the ceiling plate side end of the hub of the reel, or the like, and deformation of this flange or the like can be prevented. Namely, when the reel has a pair of flanges or the like at the ceiling plate side and the floor plate side thereof, deformation of the flanges can be prevented.

The recording tape cartridge relating to the first aspect of the present invention has the feature that, in the recording tape cartridge, when the locking member is positioned at the restricting position, a portion of the locking member, which portion is abutted by the reel which is attempting to move toward the ceiling plate, is positioned only between inner and outer peripheral surfaces of the hub as seen from the axial direction of the reel.

In the recording tape cartridge relating to the first aspect of the present invention, the region of the locking member positioned at the restricting position, which region is abutted by the reel which is attempting to move toward the ceiling plate, is positioned only between the inner and outer peripheral surfaces of the hub at the reel. Therefore, at the ceiling plate side portion of the reel, the aforementioned moving restricting force is applied only within the range of the thickness of the hub which has high rigidity in the reel axial direction. In this way, deformation of the reel accompanying the restriction of movement of the reel can be reliably prevented. In particular, in a structure in which, when the locking member is positioned at the restricting position, among surfaces of the reel which face toward the floor plate, only the portion which is positioned between the inner and outer peripheral surfaces of the hub is made to abut the case, the aforementioned moving restricting force is applied only within the range of the thickness of the hub which has high rigidity in the reel axial direction, and deformation of the reel is reliably prevented.

The recording tape cartridge relating to the first aspect of the present invention has the feature that the case and the locking member have portions which overlap one another between inner and outer peripheral surfaces of the hub as seen from the axial direction of the reel, when the locking member is positioned at the restricting position.

In this recording tape cartridge, the locking member, which is positioned at the restricting position, and the case have portions which overlap one another between the inner and outer peripheral surfaces of the hub as seen from the axial direction of the reel. Therefore, the aforementioned movement restricting force is prevented from generating a couple of forces (a moment) which tilts the reel. In this way, when the locking member is positioned at the restricting position, tilting of the reel with respect to the case (a change in the posture of the reel) is reliably prevented.

The locking member used in the present invention may be structured, for example, so as to usually be held at the restricting position by an urging member such as a spring or the like, and so as to be moved to and held at the restriction releasing position by being operated by a drive device via a switching member or the like. Or, the locking member may be structured such that the movements thereof in the respective directions between the restricting position and the restriction releasing position are carried out by the locking member being operated by a drive device via a switching member or the like. Further, the following structure may be utilized: this switching member may be a braking member which can be set at a rotation locking position, at which the braking member impedes rotation of the reel with respect to the case, and a rotation permitting position, at which the braking member is withdrawn from the rotation locking position and permits rotation of the reel with respect to the case. When the reel is positioned at the rotation locked position, the locking member can be positioned at the restricting position, and when the reel is positioned at the rotation permitted position, the locking member can be disposed at the restriction releasing position. In such a structure, the state in which rotation of the reel is locked and the state in which axial direction movement of the reel is restricted can be released by a single operation of the drive device.

As described above, the recording tape cartridge relating to the present invention has the excellent effect that, when the recording tape cartridge is not in use, the reel can be prevented from changing posture and from deforming within the case.

What is claimed is:

1. A recording tape cartridge comprising:
  a reel, a recording tape being wound around an outer periphery of a cylindrical tubular hub provided at an axially central portion of the reel;
  a case having a ceiling plate and a floor plate which oppose one another, the reel being accommodated in the case so as to be able to move along an axial direction between the ceiling plate and the floor plate; and
  a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel,
  wherein, when the locking member is positioned at the restricting position, among surfaces of the reel which face toward the floor plate, only a portion which is positioned further toward a radial direction inner side than an outer peripheral surface of the hub abuts the case.

2. The recording tape cartridge of claim 1, wherein, when the locking member is positioned at the restricting position, among the surfaces of the reel which face toward the floor plate, only a portion which is positioned between inner and outer peripheral surfaces of the hub as seen from the axial direction, abuts the case.

3. The recording tape cartridge of claim 1, wherein, when the locking member is positioned at the restricting position, a portion of the locking member, which portion is abutted by the reel which is attempting to move toward the ceiling plate, is positioned only further toward the radial direction inner side than the outer peripheral surface of the hub.

4. The recording tape cartridge of claim 3, wherein, when the locking member is positioned at the restricting position, a portion of the locking member, which portion is abutted by the reel which is attempting to move toward the ceiling plate, is positioned only between inner and outer peripheral surfaces of the hub as seen from the axial direction of the reel.

5. The recording tape cartridge of claim 1, wherein the case and the locking member have portions which overlap one another between inner and outer peripheral surfaces of the hub as seen from the axial direction of the reel, when the locking member is positioned at the restricting position.

6. A recording tape cartridge comprising:
  a reel, a recording tape being wound around an outer periphery of a cylindrical tubular hub provided at an axially central portion of the reel;
  a case having a ceiling plate and a floor plate which oppose one another, the reel being accommodated in the case so as to be able to move along an axial direction between the ceiling plate and the floor plate; and
  a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel,
  wherein a region of the reel which region abuts the locking member when axial direction movement of the reel toward the ceiling plate is restricted by the locking member positioned at the restricting position, and a region of the reel which region abuts the case when axial direction movement of the reel toward the floor plate is restricted by the case, overlap one another in a peripheral direction and a radial direction of the hub between inner and outer peripheral surfaces of the hub.

7. A recording tape cartridge comprising:
  a reel, a recording tape being wound around an outer periphery of a cylindrical tubular hub provided at an axially central portion of the reel;
  a case having a ceiling plate and a floor plate which oppose one another, the reel being accommodated in the case so as to be able to move along an axial direction between the ceiling plate and the floor plate; and
  a locking member able to be set at a restricting position, at which, in a state in which the reel is shifted toward the floor plate, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel, wherein, when the locking member is positioned at the restricting position, a surface area of abutment between the case and a portion of the reel, which portion is positioned between inner and outer peripheral surfaces of the hub as seen from the axial direction, is greater than a surface area of abutment between the case and other portions of the reel.

8. A recording tape cartridge comprising:

a reel, a recording tape being wound around an outer periphery of a cylindrical tubular hub provided at an axially central portion of the reel;

a case having a ceiling plate and a floor plate which oppose one another, the reel being accommodated in the case so as to be able to move along an axial direction between the ceiling plate and the floor plate;

an abutment portion provided at the floor plate along a circumference which is coaxial with the reel, the reel abutting the abutment portion at a time of non-use; and a locking member able to be set at a restricting position, at which, in a state in which the reel abuts the abutment portion, the locking member is disposed between a ceiling plate side end portion of the reel and the ceiling plate and restricts axial direction movement of the reel, and a restriction releasing position, at which the locking member is withdrawn from the restricting position and permits the axial direction movement of the reel, wherein a length of abutment, along a radial direction, between the abutment portion and a portion of the reel which portion is positioned between inner and outer peripheral surfaces of the hub as seen from the axial direction, is greater than a length of abutment, along the radial direction, between the abutment portion and other portions of the reel.

* * * * *